(12) United States Patent
Smith et al.

(10) Patent No.: US 8,949,340 B2
(45) Date of Patent: *Feb. 3, 2015

(54) SYSTEMS AND METHODS FOR ORGANIZING CONTENT FOR MOBILE MEDIA SERVICES

(75) Inventors: Daniel C. Smith, Boston, MA (US);
Jack Odell, Jamaica Plain, MA (US);
Rekha Singh, Arlington, MA (US);
Kevin W Massey, Cambridge, MA (US)

(73) Assignee: Boadin Technology, LLC, Newark, DE (US)

( * ) Notice: Subject to any disclaimer, the term of this patent is extended or adjusted under 35 U.S.C. 154(b) by 1218 days.

This patent is subject to a terminal disclaimer.

(21) Appl. No.: 12/026,286

(22) Filed: Feb. 5, 2008

(65) Prior Publication Data

US 2008/0250035 A1    Oct. 9, 2008

(51) Int. Cl.
*G06F 15/16*    (2006.01)
*H04M 3/487*    (2006.01)
*H04M 3/493*    (2006.01)

(52) U.S. Cl.
CPC ............ *H04M 3/4878* (2013.01); *H04M 3/493* (2013.01)
USPC .......................................... 709/206; 709/205

(58) Field of Classification Search
USPC ................................................. 709/205, 206
See application file for complete search history.

(56) References Cited

U.S. PATENT DOCUMENTS

| | | | |
|---|---|---|---|
| 4,356,589 A | 11/1982 | Mealing et al. | 15/320 |
| 6,065,051 A | 5/2000 | Steele et al. | 709/219 |
| 6,199,157 B1 | 3/2001 | Dov et al. | 713/1 |
| 6,253,325 B1 | 6/2001 | Steele et al. | 713/201 |
| 6,314,458 B1 | 11/2001 | Steele et al. | 709/219 |
| 6,393,468 B1 | 5/2002 | McGee | 709/218 |
| 6,421,651 B1 | 7/2002 | Tedesco et al. | 705/8 |
| 6,430,537 B1 | 8/2002 | Tedesco et al. | 705/8 |
| 6,571,216 B1 | 5/2003 | Garg et al. | 705/14.25 |
| 6,633,311 B1 | 10/2003 | Douvikas et al. | 345/731 |
| 6,691,158 B1 | 2/2004 | Douvikas et al. | 709/219 |
| 6,889,213 B1 | 5/2005 | Douvikas et al. | 705/67 |
| 6,952,730 B1 | 10/2005 | Najork et al. | 709/225 |
| 6,961,330 B1 | 11/2005 | Cattan et al. | 370/474 |
| 7,017,109 B1 | 3/2006 | Douvikas et al. | 715/501.1 |
| 7,024,451 B2 | 4/2006 | Jorgenson | 709/203 |

(Continued)

OTHER PUBLICATIONS

Office Action from U.S. Appl. No. 12/026,256 which was mailed on Apr. 5, 2011.
Office Action from U.S. Appl. No. 12/026,278 which was mailed on Apr. 5, 2011.
Office Action from U.S. Appl. No. 12/026,278 which was mailed on Jul. 13, 2011.
Office Action from U.S. Appl. No. 12/026,278 which was mailed on Sep. 1, 2011.

(Continued)

*Primary Examiner* — Adnan Mirza
(74) *Attorney, Agent, or Firm* — Patrick E. Caldwell, Esq.; The Caldwell Firm, LLC

(57) ABSTRACT

In embodiments of the present invention, systems and methods for organizing content for media services may comprise organizing content from a plurality of data sources having information relevant to a channel, transforming the content into short messages suitable for delivery to a user via at least two of SMS, MMS, WAP, e-mail, and the Internet, and managing a script of such messages, wherein the next short message in a series is based on a user response to a prior short message in the series. User engagement may be facilitated by developing locally produced, personalized channels for delivery of relevant content. The mobile platform may enable building mobile-oriented communities around original content. Content may be local, authentic, relevant, insider, original, aggregated, a multi-modal mash-up, and the like.

80 Claims, 15 Drawing Sheets

(56) References Cited

U.S. PATENT DOCUMENTS

| | | | | |
|---|---|---|---|---|
| 7,069,308 | B2 | 6/2006 | Abrams | 709/218 |
| 7,117,254 | B2 | 10/2006 | Lunt et al. | 709/218 |
| 7,188,080 | B1 | 3/2007 | Walker et al. | 705/26 |
| 7,188,153 | B2 | 3/2007 | Lunt et al. | 709/218 |
| 7,231,428 | B2 | 6/2007 | Teague | 709/206 |
| 7,233,997 | B1 | 6/2007 | Leveridge et al. | 709/229 |
| 7,340,419 | B2 | 3/2008 | Walker et al. | 705/27 |
| 7,373,338 | B2 | 5/2008 | Thompson et al. | 707/3 |
| 7,451,161 | B2 | 11/2008 | Zhu et al. | 707/104.1 |
| 7,478,078 | B2 | 1/2009 | Lunt et al. | 707/1 |
| 7,526,440 | B2 | 4/2009 | Walker et al. | 705/26 |
| 7,606,687 | B2 | 10/2009 | Galbreath et al. | 703/3 |
| 7,669,123 | B2 | 2/2010 | Zuckerberg et al. | 715/273 |
| 7,680,882 | B2 | 3/2010 | Tiu et al. | 709/203 |
| 7,689,466 | B1 | 3/2010 | Benbrahim et al. | 705/26.1 |
| 7,725,492 | B2 | 5/2010 | Sittig et al. | 707/784 |
| 7,788,260 | B2 | 8/2010 | Lunt et al. | 707/727 |
| 7,797,256 | B2 | 9/2010 | Zuckerberg et al. | 705/319 |
| 7,809,805 | B2 | 10/2010 | Stremel et al. | 709/219 |
| 7,827,208 | B2 | 11/2010 | Bosworth et al. | 707/802 |
| 7,827,265 | B2 | 11/2010 | Cheever et al. | 709/223 |
| 7,835,950 | B2 | 11/2010 | Walker et al. | 705/27 |
| 7,890,501 | B2 | 2/2011 | Lunt et al. | 707/722 |
| 7,912,758 | B2 | 3/2011 | Walker et al. | 705/26 |
| 7,933,810 | B2 | 4/2011 | Morgenstern | 705/26.1 |
| 7,945,653 | B2 | 5/2011 | Zuckerberg et al. | 709/223 |
| 7,970,657 | B2 | 6/2011 | Morgenstern | 705/26.1 |
| 2002/0104083 | A1 | 8/2002 | Hendricks et al. | 725/34 |
| 2002/0164977 | A1 | 11/2002 | Link, II et al. | 455/414 |
| 2003/0114146 | A1 | 6/2003 | Benson | 455/414 |
| 2003/0187996 | A1 | 10/2003 | Cardina et al. | 709/228 |
| 2004/0073924 | A1 | 4/2004 | Pendakur | 725/46 |
| 2004/0243519 | A1 | 12/2004 | Perttila et al. | 705/75 |
| 2005/0038876 | A1* | 2/2005 | Chaudhuri | 709/219 |
| 2005/0076365 | A1 | 4/2005 | Popov et al. | 725/46 |
| 2005/0177419 | A1 | 8/2005 | Choi et al. | 705/14 |
| 2005/0245241 | A1 | 11/2005 | Durand et al. | 455/414.1 |
| 2005/0267940 | A1 | 12/2005 | Galbreath et al. | 709/206 |
| 2005/0278443 | A1 | 12/2005 | Winner et al. | 709/224 |
| 2006/0021009 | A1 | 1/2006 | Lunt | 726/4 |
| 2006/0031404 | A1 | 2/2006 | Kassab | 709/218 |
| 2006/0099936 | A1 | 5/2006 | Link, II et al. | 455/414.1 |
| 2006/0218234 | A1* | 9/2006 | Deng et al. | 709/206 |
| 2006/0239546 | A1 | 10/2006 | Tedesco et al. | 382/159 |
| 2007/0022021 | A1 | 1/2007 | Walker et al. | 705/26 |
| 2007/0088852 | A1 | 4/2007 | Levkovitz | 709/246 |
| 2007/0192299 | A1 | 8/2007 | Zuckerberg et al. | 707/3 |
| 2008/0040474 | A1 | 2/2008 | Zuckerberg et al. | 709/224 |
| 2008/0040475 | A1 | 2/2008 | Bosworth et al. | 709/224 |
| 2008/0046976 | A1 | 2/2008 | Zuckerberg | 726/4 |
| 2008/0065604 | A1 | 3/2008 | Tiu et al. | 707/3 |
| 2008/0065701 | A1 | 3/2008 | Lindstrom et al. | 707/201 |
| 2008/0155588 | A1 | 6/2008 | Roberts et al. | 725/34 |
| 2008/0189292 | A1 | 8/2008 | Stremel et al. | 707/10 |
| 2008/0189380 | A1 | 8/2008 | Bosworth et al. | 709/207 |
| 2008/0189395 | A1 | 8/2008 | Stremel et al. | 709/219 |
| 2008/0189768 | A1 | 8/2008 | Callahan et al. | 726/4 |
| 2008/0274694 | A1* | 11/2008 | Castell et al. | 455/26.1 |
| 2008/0313714 | A1 | 12/2008 | Fetterman et al. | 726/4 |
| 2009/0013413 | A1 | 1/2009 | Vera et al. | 726/30 |
| 2009/0024548 | A1 | 1/2009 | Zhu et al. | 706/21 |
| 2009/0031301 | A1 | 1/2009 | D'Angelo et al. | 717/178 |
| 2009/0037277 | A1 | 2/2009 | Zuckerberg et al. | 705/14 |
| 2009/0048922 | A1 | 2/2009 | Morgenstern et al. | 705/14 |
| 2009/0049014 | A1 | 2/2009 | Steinberg | 707/3 |
| 2009/0049036 | A1 | 2/2009 | Juan et al. | 707/5 |
| 2009/0049070 | A1 | 2/2009 | Steinberg | 707/101 |
| 2009/0049127 | A1 | 2/2009 | Juan et al. | 709/204 |
| 2009/0049525 | A1 | 2/2009 | D'Angelo et al. | 726/4 |
| 2009/0070219 | A1 | 3/2009 | D'Angelo et al. | 705/14 |
| 2009/0070334 | A1 | 3/2009 | Callahan et al. | 707/9 |
| 2009/0070412 | A1 | 3/2009 | D'Angelo et al. | 709/203 |
| 2009/0119167 | A1 | 5/2009 | Kendall et al. | 705/14 |
| 2009/0144392 | A1 | 6/2009 | Wang et al. | 709/217 |
| 2009/0182589 | A1 | 7/2009 | Kendall et al. | 705/5 |
| 2009/0198487 | A1 | 8/2009 | Wong et al. | 704/4 |
| 2009/0228342 | A1 | 9/2009 | Walker et al. | 705/10 |
| 2009/0228780 | A1 | 9/2009 | McGeehan | 715/234 |
| 2010/0049534 | A1 | 2/2010 | Whitnah et al. | 705/1 |
| 2010/0049852 | A1 | 2/2010 | Whitnah et al. | 709/226 |
| 2010/0132049 | A1 | 5/2010 | Vernal et al. | 726/27 |
| 2010/0162375 | A1 | 6/2010 | Tiu, Jr. et al. | 726/7 |
| 2010/0164957 | A1 | 7/2010 | Lindsay et al. | 345/440 |
| 2010/0169327 | A1 | 7/2010 | Lindsay et al. | 707/750 |
| 2010/0180032 | A1 | 7/2010 | Lunt | 709/225 |
| 2010/0185580 | A1 | 7/2010 | Zhu et al. | 706/52 |
| 2010/0198581 | A1 | 8/2010 | Ellis | 704/4 |
| 2010/0211996 | A1 | 8/2010 | McGeehan et al. | 726/4 |
| 2010/0211997 | A1 | 8/2010 | McGeehan et al. | 726/4 |
| 2010/0217645 | A1 | 8/2010 | Jin et al. | 705/9 |
| 2010/0229223 | A1 | 9/2010 | Shepard et al. | 726/5 |
| 2010/0257023 | A1 | 10/2010 | Kendall et al. | 705/10 |
| 2010/0257459 | A1 | 10/2010 | Galbreath et al. | 715/753 |
| 2010/0306043 | A1 | 12/2010 | Lindsay et al. | 705/14.41 |
| 2010/0318571 | A1 | 12/2010 | Pearlman et al. | 707/784 |
| 2011/0004692 | A1 | 1/2011 | Occhino et al. | 709/228 |
| 2011/0004831 | A1 | 1/2011 | Steinberg et al. | 715/753 |
| 2011/0016169 | A1 | 1/2011 | Cahill et al. | 709/203 |
| 2011/0016381 | A1 | 1/2011 | Cahill et al. | 715/234 |
| 2011/0016382 | A1 | 1/2011 | Cahill et al. | 715/234 |
| 2011/0018342 | A1 | 1/2011 | Park et al. | 307/23 |
| 2011/0022657 | A1 | 1/2011 | Zhu et al. | 709/204 |
| 2011/0023101 | A1 | 1/2011 | Vernal et al. | 726/7 |
| 2011/0023129 | A1 | 1/2011 | Vernal et al. | 726/28 |
| 2011/0044354 | A1 | 2/2011 | Wei | 370/468 |
| 2011/0055314 | A1 | 3/2011 | Rosenstein et al. | 709/203 |
| 2011/0055332 | A1 | 3/2011 | Stein | 709/206 |
| 2011/0055683 | A1 | 3/2011 | Jiang | 715/234 |
| 2011/0083101 | A1 | 4/2011 | Sharon et al. | 715/800 |
| 2011/0087526 | A1 | 4/2011 | Morgenstern et al. | 705/14.1 |
| 2011/0106630 | A1 | 5/2011 | Hegeman et al. | 705/14.71 |
| 2011/0125599 | A1 | 5/2011 | Morin et al. | 705/26.1 |
| 2011/0128699 | A1 | 6/2011 | Heydari et al. | 361/679.48 |
| 2011/0137902 | A1 | 6/2011 | Wable et al. | 707/737 |
| 2011/0137932 | A1 | 6/2011 | Wable | 707/769 |
| 2011/0145287 | A1 | 6/2011 | Jiang et al. | 707/780 |
| 2011/0145321 | A1 | 6/2011 | Jiang | 709/203 |
| 2011/0153377 | A1 | 6/2011 | Novikov et al. | 705/71.1 |
| 2011/0153412 | A1 | 6/2011 | Novikov et al. | 705/14.42 |
| 2011/0153416 | A1 | 6/2011 | Walker et al. | 705/14.49 |
| 2011/0153421 | A1 | 6/2011 | Novikov et al. | 705/14.52 |
| 2011/0154223 | A1 | 6/2011 | Whitnah et al. | 715/753 |
| 2011/0154842 | A1 | 6/2011 | Heydari et al. | 62/259.2 |
| 2011/0156480 | A1 | 6/2011 | Park | 307/23 |
| 2011/0161602 | A1 | 6/2011 | Adams et al. | 711/148 |
| 2011/0161980 | A1 | 6/2011 | English et al. | 718/105 |
| 2011/0161987 | A1 | 6/2011 | Huang et al. | 719/318 |
| 2011/0179347 | A1 | 7/2011 | Proctor et al. | 715/234 |
| 2011/0196855 | A1 | 8/2011 | Wable et al. | 707/711 |

OTHER PUBLICATIONS

Office Action from U.S. Appl. No. 12/026,256 which was mailed on Oct. 28, 2011.

Notice of Allowance from U.S. Appl. No. 12/026,278 which was mailed on Jan. 9, 2012.

Office Action from U.S. Appl. No. 13/301,771 dated Feb. 3, 2012.

U.S. Appl. No. 12/026,278, filed Feb. 5, 2008.

U.S. Appl. No. 12/026,256, filed Feb. 5, 2008.

U.S. Appl. No. 13/301,771, filed Nov. 21, 2011.

Notice of Allowance from U.S. Appl. No. 12/026,278 dated Mar. 19, 2012.

Notice of Allowance from U.S. Appl. No. 12/026,156 dated Mar. 30, 2012.

Notice of Allowance from U.S. Appl. No. 12/026,156 dated Jun. 6, 2012.

Office Action from U.S. Appl. No. 13/301,771 dated Jun. 18, 2012.
Office Action from U.S. Appl. No. 13/430,658 dated Sep. 10, 2012.
Office Action from U.S. Appl. No. 13/430,658 dated Feb. 25, 2013.

* cited by examiner

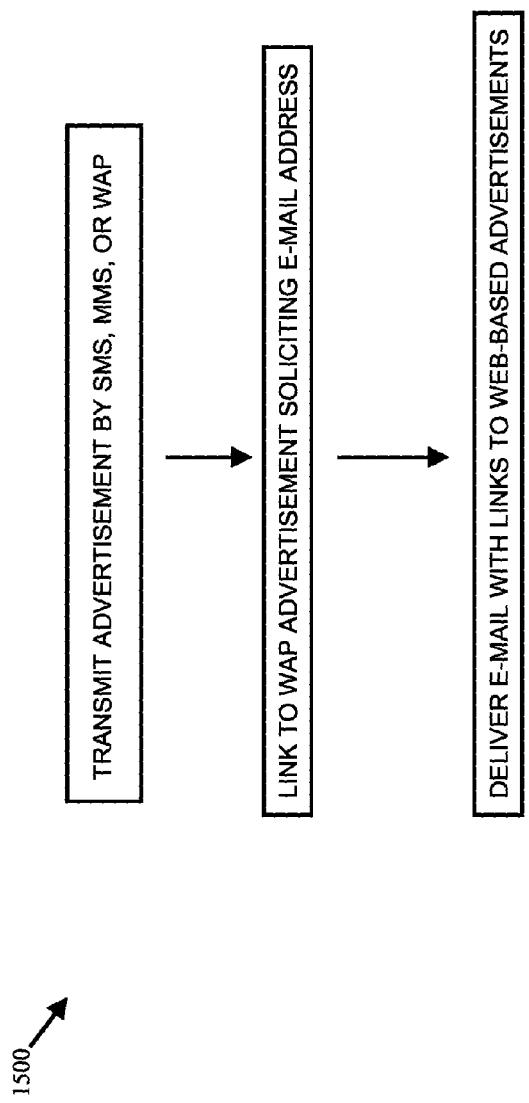

SYSTEMS AND METHODS FOR ORGANIZING CONTENT FOR MOBILE MEDIA SERVICES

CROSS-REFERENCE TO RELATED APPLICATIONS

This application claims the benefit of the following provisional applications, each of which is hereby incorporated by reference in its entirety:

U.S. Provisional Application Ser. No. 60/888,310, filed Feb. 5, 2007; and U.S. Provisional Application Ser. No. 60/940,296, filed May 25, 2007.

BACKGROUND

1. Field

The present invention relates generally to media services. More particularly, the present invention relates to systems and methods for mobile media services comprising locally produced, personalized channels for delivery of relevant content.

2. Description of the Related Art

The Internet has emerged as a dominant venue for access to news and information. No doubt ease of access to a depth and breadth of timely content has facilitated the Internet's dominance in these fields. Many mobile devices have recently begun to deploy methods for mobile Internet access. However, mobile internet access is often restricted by download speeds and awkward user interfaces.

The widespread access to mobile networks has led to rapid growth in the numbers of users of SMS and SMS alert systems. Typically, SMS is used as a means to communicate with other SMS users, but can also be used to deliver content such as news and information. In general, such content may be delivered to the mobile device with little interaction from the user required, which may result in irrelevant content.

Thus, a need exists for a method to deploy customizable, relevant content to mobile devices via a protocol such as SMS.

SUMMARY

Mobile media services enable providing relevant content that may be transformed for delivery to a user's handset. Users may interact with the content in a templated or non-templated fashion to receive additional content, view an advertisement, and subscribe to a channel for content delivery.

Provided herein are systems and methods for mobile media services and delivery of mobile content. In an aspect of the invention, a method for delivering mobile content may involve acquiring content, transforming the content, wherein transforming comprises one or more of compressing text, case-correcting text, and adding tone, style, or bias, and delivering the content to a mobile device. The content may be feed-driven content; editorial-driven content; content that is associated with a feed, an author, an editor, and so forth. Delivering the content to a mobile device may occur via a pull (for example and without limitation, in response to a request) and/or via a push (for example and without limitation, via a publish/subscribe technique). In a variation of this method, the method further comprises targeting the content.

In an aspect of the invention, a system and method may comprise accessing a definition of a state machine, the states of the machine being associated with messages, the transitions between states being associated with inputs, the state machine containing a start state and at least one end state; receiving the messages; transforming the messages for delivery to a handset; and beginning with a state that is the start state and continuing until the state is an end state: transmitting the message that is associated with the state; receiving an input from the handset in response to the message; selecting a next state by following a transition from the state, the transition being associated with the input; and setting the state to the next state. In an embodiment, the method further comprises receiving approval of the messages at some time prior to transmitting the messages. In an embodiment, the message that is associated with the start state may be a provocation. In an embodiment, the messages may be received from a feed. In an embodiment, the messages may relate to at least one of content delivery, user acquisition, subscription, billing, and profile management. In an embodiment, at least one template may specify the definition of the state machine. The template may be a message flow template. In an embodiment, the state machine may be associated with a channel. In an embodiment, transmitting the message that is associated with the state further comprises transmitting a request for reply. The request for reply may comprise an associated command alias to serve as the input. The command alias may be at least one of a number, a letter, a short word, a code, and a combination of a letter and a number. The command alias may be unique to at least one of an individual user, a set of users with similar subscription profiles, a channel, and each channel to which a user is subscribed. The command alias may be used to access non-templated content. A user may access more than one state with a single command alias. In an embodiment, the messages may include a provocation message, a description message, a pick message, an information message, and a short description message. In an embodiment, the messages may include a provocation message, a description message, an information message, and a what's-nearby message. In an embodiment, the messages may include a provocation message, a first personal pick message, a second personal pick message, a hang-outs message, and contact information. In an embodiment, the messages may include a provocation message, an introduction message, a body message, a conclusion message, and a review message. In an embodiment, the messages may include a top picks message, an event message, a review message, a description message, a picks message, and an information message.

In an aspect of the invention, a system and method may include transmitting a message including content to a handset, soliciting a response message, wherein the solicitation indicates a short form command structure for the response, receiving a response from the handset including a short form command; and processing the response using the short form command. In the system and method, the short form command may be at least one of a number, a letter, multiples of letters, short words, and a number and a letter. In the system and method, the short form command may increment with each request for response. In the system and method, the short form command may indicate a desire to receive all available content associated with the message. In the system and method, the short form command may indicate that no further messages should be sent. In the system and method, the short form command indicates that the user should receive a phone call. In the system and method, the short form command may be persistent for a defined period of time. In the system and method, the short form command may be persistent until a set of commands allocated to at least one of the user and channel has been exhausted. In the system and method, the short form command may be unique to at least one of an individual user, a set of users with similar subscription profiles, a channel, and each channel to which a user is subscribed. In the system and method, interpreting the short form command may be done without regard to at least one of the channel the user is currently receiving messages from, a message the user received, and when a message was received by a user. In the system and method, the short form command may facilitate navigation of content in a non-templated fashion, user acquisition, subscription, and profile management. In the system and method, the content of the message may be transformed for delivery to the handset. In the system and method, the message content may relate to at least one of weather, advertising, news, sports, entertainment, lifestyle, culture, community, user-generated content, and social networking. In the system and method, the message may be transmitted via at least one of SMS, MMS, WAP, the Internet, and e-mail.

In an aspect of the invention, a system and method may include receiving content from a source, transforming the content into a format suitable for delivery to a handset of the end user, transmitting a message including the content to a handset, soliciting a response message, wherein the solicitation indicates a short form command structure for the response, receiving a response from the handset including a short form command, and processing the response using the short form command. In the system and method, the short form command may be at least one of a number, a letter, multiples of letters, short words, and a number and a letter. In the system and method, the short form command may increment with each request for response. In the system and method, the short form command may indicate a desire to receive all available content associated with the message. In the system and method, the short form command may indicate that no further messages should be sent. In the system and method, the short form command indicates that the user should receive a phone call. In the system and method, the short form command may be persistent for a defined period of time. In the system and method, the short form command may be persistent until a set of commands allocated to at least one of the user and channel has been exhausted. In the system and method, the short form command may be unique to at least one of an individual user, a set of users with similar subscription profiles, a channel, and each channel to which a user is subscribed. In the system and method, interpreting the short form command may be done without regard to at least one of the channel the user is currently receiving messages from, a message the user received, and when a message was received by a user. In the system and method, the short form command may facilitate navigation of content in a non-templated fashion, user acquisition, subscription, and profile management. In the system and method, the content of the message may be transformed for delivery to the handset. In the system and method, the message content may relate to at least one of weather, advertising, news, sports, entertainment, lifestyle, culture, community, user-generated content, and social networking. In the system and method, the message may be transmitted via at least one of SMS, MMS, WAP, the Internet, and e-mail. In the system and method, transforming may include at least one of text compression, case correction, handset display size correction, and handset aspect ratio correction. In the system and method, transforming may include adding tone to content received from a feed. In the system and method, transforming may include adding bias to content received from a feed. In the system and method, transforming may include adding style to content received from a feed.

In an aspect of the invention, a system and method for multi-modal mobile media services may include delivering a message including content to a user handset, associating an offer for additional content with the message, associating at least response message solicitation with the offer, wherein the solicitation is associated with a mode for accessing the additional content and a short form command structure, receiving a response from the handset including a short form command, transmitting the additional content via the mode indicated by the response, and executing a command using the short form command structure. In the system and method, the additional content may be accessible via at least one of SMS messaging, a WAP link, a click-to-call link, content from another channel, instant messaging, Internet search, and an Internet page. In the system and method, the content may also be accessible by at least one of SMS messaging, a WAP link, a click-to-call link, content from another channel, instant messaging, e-mail, Internet search, and an Internet page. In the system and method, transmitting may include accessing a WAP interface. In the system and method, transmitting may include accessing an internet browser. In the system and method, transmitting may include accessing a telephony function. In the system and method, transmitting may include accessing an e-mail application. In the system and method, the short form command may be at least one of a number, a letter, multiples of letters, short words, and a number and a letter. In the system and method, the short form command may increment with each request for response. In the system and method, the short form command may indicate a desire to receive all available content associated with the message. In the system and method, the short form command may indicate that no further messages should be sent. In the system and method, the short form command indicates that the user should receive a phone call. In the system and method, the short form command may be persistent for a defined period of time. In the system and method, the short form command may be persistent until a set of command aliases allocated to at least one of the user and channel has been exhausted. In the system and method, the short form command may be unique to at least one of an individual user, a set of users with similar subscription profiles, a channel, and each channel to which a user is subscribed. In the system and method, interpreting the short form command may be done without regard to at least one of the channel the user is currently receiving messages. In the system and method, the content of the message may be transformed for delivery to the handset. In the system and method, the message content may relate to at least one of weather, advertising, news, sports, entertainment, lifestyle, culture, community, user-generated content, and social networking.

In an aspect of the invention, a system and method of generating a mobile content narrative may include accessing a definition of a state machine, the states of the machine being associated with messages including a narrative, the transitions between states being associated with inputs, transmitting the message that is associated with the state, receiving an input from the handset in response to the message, selecting a next state by following a transition from the state, the transition being associated with the handset input and the next state being associated with the next message in a narrative, and setting the state to the next state. In the system and method, the message that may be associated with the start state is a provocation. In the system and method, the message may be received from a feed. In the system and method, the message may relate to at least one of content delivery, user acquisition, subscription, billing, and profile management. In the system and method, at least one template may specify the definition of the state machine. The template may be a message flow template. In the system and method, the state machine may be associated with a channel. In the system and method, transmitting the message that is associated with the state includes transmitting a request for reply. In the system and method, the request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the command alias is used to access non-templated content. In the system and method, a user may access more than one state with a single command alias. In the system and method, the content of the message may be transformed into a format suitable for delivery to a handset. In the system and method, the message may be transmitted via at least one of SMS, MMS, WAP, the Internet, and e-mail.

In an aspect of the invention, a system and method of generating a mobile content narrative includes accessing a definition of a state machine, the states of the machine being associated with messages including a narrative, the transitions between states being associated with inputs, transmitting the message that is associated with the state, wherein the message includes content transformed into a format suitable for delivery to a handset, receiving an input from the handset in response to the message, selecting a next state by following a transition from the state, the transition being associated with the handset input and the next state being associated with the next message in a narrative, and setting the state to the next state. In the system and method, the message that may be associated with the start state is a provocation. In the system and method, the message may be received from a feed. In the system and method, the message may relate to at least one of content delivery, user acquisition, subscription, billing, and profile management. In the system and method, at least one template may specify the definition of the state machine. The template may be a message flow template. In the system and method, the state machine may be associated with a channel. In the system and method, transmitting the message that is associated with the state includes transmitting a request for reply. In the system and method, the request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the command alias is used to access non-templated content. In the system and method, a user may access more than one state with a single command alias. In the system and method, the content of the message may be transformed into a format suitable for delivery to a handset. In the system and method, the message may be transmitted via at least one of SMS, MMS, WAP, the Internet, and e-mail.

In an aspect of the invention, a system and method of generating a mobile content narrative includes accessing a definition of a state machine, the states of the machine being associated with messages including a narrative, the transitions between states being associated with inputs, transmitting the message that is associated with the state, wherein the message indicates a short form command structure for the response to the message, receiving an input from the handset in response to the message, wherein the input includes a short form command, selecting a next state by following a transition from the state, the transition being based on the short form command input from the handset and the next state being associated with the next message in a narrative, and setting the state to the next state. In the system and method, the message that may be associated with the start state is a provocation. In the system and method, the message may be received from a feed. In the system and method, the message may relate to at least one of content delivery, user acquisition, subscription, billing, and profile management. In the system and method, at least one template may specify the definition of the state machine. The template may be a message flow template. In the system and method, the state machine may be associated with a channel. In the system and method, transmitting the message that is associated with the state includes transmitting a request for reply. In the system and method, the request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the command alias is used to access non-templated content. In the system and method, a user may access more than one state with a single command alias. In the system and method, the content of the message may be transformed into a format suitable for delivery to a handset. In the system and method, the message may be transmitted via at least one of SMS, MMS, WAP, the Internet, and e-mail.

In an aspect of the invention, a system and method of generating a mobile content narrative includes accessing a definition of a state machine, the states of the machine being associated with messages including a narrative, the transitions between states being associated with inputs, transmitting the message that is associated with the state, receiving an input in response to the message, selecting a next state by following a transition from the state, the transition being associated with the input and the next state being associated with the next message in a narrative, wherein the next message in a narrative is transmitted by at least one of SMS, MMS, WAP, e-mail, and the Internet, and setting the state to the next state. In the system and method, the message that may be associated with the start state is a provocation. In the system and method, the message may be received from a feed. In the system and method, the message may relate to at least one of content delivery, user acquisition, subscription, billing, and profile management. In the system and method, at least one template may specify the definition of the state machine. The template may be a message flow template. In the system and method, the state machine may be associated with a channel. In the system and method, transmitting the message that is associated with the state includes transmitting a request for reply. In the system and method, the request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the command alias is used to access non-templated content. In the system and method, a user may access more than one state with a single command alias. In the system and method, the content of the message may be transformed into a format suitable for delivery to a handset.

In an aspect of the invention, a system and method include organizing content from a plurality of data sources having information relevant to a channel, transforming the content into short messages suitable for delivery to and presentation on a handset, and managing a script of a series of such short messages, the script determining a next short message based on a user response to a previous short message. The system and method includes approving the content of the message prior to transmitting the messages. In the system and method, the source is a feed. In the system and method, the source is an author. In the system and method, transforming includes at least one of text compression, case correction, handset display size correction, and handset aspect ratio correction. In the system and method, transforming includes adding tone to content received from a feed. In the system and method, transforming includes adding bias to content received from a feed. In the system and method, transforming includes adding style to content received from a feed. In the system and method, the messages relate to at least one of content delivery, user acquisition, subscription, billing, and profile management. In the system and method, the script is a message flow template. The system and method includes associating an advertisement with the message. Associating the advertisement with the message is done contextually. In the system and method, the message includes a request for reply. The request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the message content relates to at least one of weather, advertising, news, sports, entertainment, lifestyle, culture, community, user-generated content, and social networking.

In an aspect of the invention, a system and method includes organizing content from a plurality of data sources having information relevant to a channel, transforming the content into short messages suitable for delivery to and presentation on a handset, and managing a script of such short messages based on user responses, wherein the response comprises a short form command and wherein the next short message in a series is based on the script and on the received short form command. The system and method includes approving the content of the message prior to transmitting the messages. In the system and method, the source is a feed. In the system and method, the source is an author. In the system and method, transforming includes at least one of text compression, case correction, handset display size correction, and handset aspect ratio correction. In the system and method, transforming includes adding tone to content received from a feed. In the system and method, transforming includes adding bias to content received from a feed. In the system and method, transforming includes adding style to content received from a feed. In the system and method, the messages relate to at least one of content delivery, user acquisition, subscription, billing, and profile management. In the system and method, the script is a message flow template. The system and method includes associating an advertisement with the message. Associating the advertisement with the message is done contextually. In the system and method, the message includes a request for reply. The request for reply includes an associated short form command to serve as the input. In the system and method, the short form command is at least one of a number, a letter, a short word, a code, and a combination of a letter and a number. In the system and method, the short form command is unique to at least one of an individual user, a set of users with similar subscription profiles, a channel, and each channel to which a user is subscribed. In the system and method, the message content relates to at least one of weather, advertising, news, sports, entertainment, lifestyle, culture, community, user-generated content, and social networking.

In an aspect of the invention, a system and method includes organizing content from a plurality of data sources having information relevant to a channel, transforming the content into short messages suitable for delivery to a user via at least two of SMS, MMS, WAP, e-mail, and the Internet, and managing a script of such messages, wherein the next short message in a series is based on a user response to a prior short message in the series. The system and method includes approving the content of the message prior to transmitting the messages. In the system and method, the source is a feed. In the system and method, the source is an author. In the system and method, transforming includes at least one of text compression, case correction, handset display size correction, and handset aspect ratio correction. In the system and method, transforming includes adding tone to content received from a feed. In the system and method, transforming includes adding bias to content received from a feed. In the system and method, transforming includes adding style to content received from a feed. In the system and method, the messages relate to at least one of content delivery, user acquisition, subscription, billing, and profile management. In the system and method, the script is a message flow template. The system and method includes associating an advertisement with the message. Associating the advertisement with the message is done contextually. The system and method includes soliciting a response message, wherein the response includes a short form command structure. In the system and method, the short form command is at least one of a number, a letter, a short word, a code, and a combination of a letter and a number. In the system and method, the short form command is unique to at least one of an individual user, a set of users with similar subscription profiles, a channel, and each channel to which a user is subscribed. In the system and method, the message content relates to at least one of weather, advertising, news, sports, entertainment, lifestyle, culture, community, user-generated content, and social networking.

In an aspect of the invention, a system and method includes organizing content from a plurality of data sources having information relevant to a channel, transforming the content into messages suitable for delivery to and presentation on a handset, accessing a definition of a state machine, the states of the machine being associated with the messages, the transitions between states being associated with inputs, transmitting the message that is associated with the state, selecting a next state by following a transition from the state, the transition being associated with the input and the next state being associated with the next message in a narrative, and managing a script of such messages based on the inputs. In the system and method, the source is a feed. In the system and method, the source is an author. In the system and method, transforming includes at least one of text compression, case correction, handset display size correction, and handset aspect ratio correction. In the system and method, transforming includes adding tone to content received from a feed. In the system and method, transforming includes adding bias to content received from a feed. In the system and method, transforming includes adding style to content received from a feed. In the system and method, the messages relate to at least one of content delivery, user acquisition, subscription, billing, and profile management. In the system and method, the script is a message flow template. The system and method includes associating an advertisement with the message. Associating the advertisement with the message is done contextually. In the system and method, the message includes a request for reply. The request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the message content relates to at least one of weather, advertising, news, sports, entertainment, lifestyle, culture, community, user-generated content, and social networking. In the system and method, at least one template specifies the definition of the state machine. The template is a message flow template. In the system and method, the state machine is associated with a channel. In the system and method, the content of the message is transformed into a format suitable for delivery to a handset. In the system and method, the message is transmitted via at least one of SMS, MMS, WAP, the Internet, and e-mail.

In an aspect of the invention, a system and method of a dynamic user acquisition platform includes requesting a mobile device identifier from an interested user, capturing a mobile device identifier submitted by the user and associating it with a short form command, setting a cookie on the user's machine linking the mobile device identifier and the short form command, generating a message and sending it to the mobile device for which the identifier is provided, wherein the message indicates that the user should reply with the short form command to receive additional content, and tracking the short form command received using the cookie to identify the origin of the acquisition. The system and method includes signing up the user for content delivery. In the system and method, the content is transmitted by at least one of SMS, MMS, WAP, e-mail, and the Internet. In the system and method, includes transmitting a channel subscription confirmation message for the indicated channel, including a request for reply to confirm the subscription. The channel subscription message includes at least one of information regarding billing, information regarding the duration of a free trial, information regarding the host of the channels, and information regarding content distribution frequency. The system and method includes transmitting a message indicating content subcategories for the selected content available in a market, wherein each available content subcategory is associated with a unique short form command. The system and method include generating a user profile with the user subscription information. The user profile auto-populates when the user transmits a short form command. In the system and method, the short form command is at least one of a number, a letter, a short word, a code, and a combination of a letter and a number. In the system and method, the short form command is unique to at least one of an individual user, a set of users with similar subscription profiles, a channel, and each channel to which a user is subscribed. In the system and method, the content is transformed into a format suitable for delivery to a handset.

In an aspect of the invention, a system and method of advertising on a mobile media services platform includes delivering a message including content to a user handset and associating an advertisement with the message, offering the user related advertisement information from within the advertisement, associating at least one request for response with the offer, wherein the request for response is associated with a short form command structure; and transmitting the related advertisement information in accordance with the short form command. The system and method include tracking the short form command to target advertisements to specific users. The system and method include tracking the short form command to measure unique impressions. The advertisement is associated contextually with the content. In the system and method, the related advertisement information is associated contextually with the content. In the system and method, the related advertisement information is accessible on at least one of the Internet, a Web search page, Internet Yellow Pages, mobile search, SMS, WAP, directory assistance, an instant message, a click-to-call link, another channel, e-mail, and a podcast. In the system and method, transmitting includes accessing a WAP interface. In the system and method, transmitting includes accessing an internet browser. In the system and method, transmitting includes accessing a telephony function. In the system and method, transmitting includes accessing an e-mail application. In the system and method, the short form command is at least one of a number, a letter, multiples of letters, short words, and a number and a letter. In the system and method, the short form command increments with each request for response. In the system and method, the short form command indicates a desire to receive all available content associated with the message. In the system and method, the short form command indicates that no further messages should be sent. In the system and method, the short form command indicates that the user should receive a phone call. In the system and method, the short form command is persistent for a defined period of time. In the system and method, the short form command is persistent until a set of commands allocated to at least one of the user and channel has been exhausted. In the system and method, the short form command is unique to at least one of an individual user, a set of users with similar subscription profiles, a channel, and each channel to which a user is subscribed. In the system and method, disambiguating the short form command is done without regard to at least one of the channel the user is currently receiving messages.

In an aspect of the invention, a method of delivering mobile content includes accessing a definition of a state machine, the states of the machine being associated with messages, the transitions between states being associated with inputs, transmitting the message that is associated with the state, receiving an input from the handset in response to the message, selecting a next state by following a transition from the state, the transition being associated with the handset input, and setting the state to the next state. The system and method includes requiring approval of the message before transmission. In the system and method, the message that may be associated with the start state is a provocation. In the system and method, the message may be received from a feed. In the system and method, the message may relate to at least one of content delivery, user acquisition, subscription, billing, and profile management. In the system and method, at least one template may specify the definition of the state machine. The template may be a message flow template. In the system and method, the state machine may be associated with a channel. In the system and method, transmitting the message that is associated with the state includes transmitting a request for reply. In the system and method, the request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the command alias is used to access non-templated content. In the system and method, a user may access more than one state with a single command alias. In the system and method, the content of the message may be transformed into a format suitable for delivery to a handset. In the system and method, the message may be transmitted via at least one of SMS, MMS, WAP, the Internet, and e-mail. In the system and method, the message flow template includes at least one of a provocation message, a description message, a pick message, an information message, and a short description message. In the system and method, the message flow template includes at least one of a provocation message, a description message, an information message, and a what's-nearby message. In the system and method, the message flow template includes at least one of a provocation message, a first personal pick message, a second personal pick message, a hang-outs message, and contact information. In the system and method, the message flow template includes at least one of a provocation message, an introduction message, a body message, a conclusion message, and a review message. In the system and method, the message flow template includes at least one of a top picks message, an event message, a review message, a description message, a picks message, and an information message.

In an aspect of the invention, a system and method of a mobile media service includes receiving content from a source, transforming the content into a format suitable for delivery to a handset of the end user, associating the content with a template, the template being associated with a message appropriate for a channel selected based on personal characteristics of an end user, and transmitting the message in accordance with the template to the handsets of subscribers to the channel. The system and method includes requiring approval of the message before transmission. In the system and method, the message that may be associated with the start state is a provocation. In the system and method, the message may be received from a feed. In the system and method, the message may be received from an author. In the system and method, the message may relate to at least one of content delivery, user acquisition, subscription, billing, and profile management. In the system and method, at least one template may specify the definition of the state machine. The template may be a message flow template. In the system and method, the state machine may be associated with a channel. In the system and method, transmitting the message that is associated with the state includes transmitting a request for reply. In the system and method, the request for reply includes an associated command alias to serve as the input. In the system and method, the command alias is at least one of a number, a letter, a short word, a code, and a combination of a letter and a number. In the system and method, the command alias is unique to at least one of an individual user, a set of users with similar subscription profiles, a channel, and each channel to which a user is subscribed. In the system and method, the command alias is used to access non-templated content. In the system and method, a user may access more than one state with a single command alias. In the system and method, the content of the message may be transformed into a format suitable for delivery to a handset. In the system and method, the message may be transmitted via at least one of SMS, MMS, WAP, the Internet, and e-mail. In the system and method, transforming may include at least one of text compression, case correction, handset display size correction, and handset aspect ratio correction. In the system and method, transforming may include adding tone to content received from a feed. In the system and method, transforming may include adding bias to content received from a feed. In the system and method, transforming may include adding style to content received from a feed. The method and system includes associating an advertisement with the message. Associating the advertisement with the message is done contextually. In the system and method, the message content relates to at least one of weather, advertising, news, sports, entertainment, lifestyle, culture, community, user-generated content, and social networking.

In an aspect of the invention, a system and method includes transmitting a message to a handset, associating a request for response with the message, wherein the request for response includes a unique command alias associated with content indicated by each available response to the message, receiving a response from the handset including a unique command alias, and processing the command alias in accordance with its unique association to content requested in the response. In the system and method, the short form command may be at least one of a number, a letter, multiples of letters, short words, and a number and a letter. In the system and method, the short form command may increment with each request for response. In the system and method, the short form command may indicate a desire to receive all available content associated with the message. In the system and method, the short form command may indicate that no further messages should be sent. In the system and method, the short form command indicates that the user should receive a phone call. In the system and method, the short form command may be persistent for a defined period of time. In the system and method, the short form command may be persistent until a set of commands allocated to at least one of the user and channel has been exhausted. In the system and method, the short form command may be unique to at least one of an individual user, a set of users with similar subscription profiles, a channel, and each channel to which a user is subscribed. In the system and method, interpreting the short form command may be done without regard to at least one of the channel the user is currently receiving messages from, a message the user received, and when a message was received by a user. In the system and method, the short form command may facilitate navigation of content in a non-templated fashion, user acquisition, subscription, and profile management. In the system and method, the content of the message may be transformed for delivery to the handset. In the system and method, the message content may relate to at least one of weather, advertising, news, sports, entertainment, lifestyle, culture, community, user-generated content, and social networking. In the system and method, the message may be transmitted via at least one of SMS, MMS, WAP, the Internet, and e-mail.

In an aspect of the invention, a system and method for personalized mobile media services includes receiving a subscription request to a channel from a user, the user being associated with a handset, subscribing the user to the channel selected by the user, the channel having content suitable for the personal tastes of the user, accessing information associated with the channel from a plurality of data sources, the data sources not being in a format for delivery to the user's handset, transforming the messages into a format suitable for delivery to the user's handset, and transmitting the messages to the user's handset. The system and method includes charging a subscription fee for the mobile media service. The fee is one or more of a daily, weekly, monthly, yearly, on-demand, per channel, and per message fee. In the system and method, transforming may include at least one of text compression, case correction, handset display size correction, and handset aspect ratio correction. In the system and method, transforming may include adding tone to content received from a feed. In the system and method, transforming may include adding bias to content received from a feed. In the system and method, transforming may include adding style to content received from a feed. The method and system includes associating an advertisement with the message. Associating the advertisement with the message is done contextually. In the system and method, the message content relates to at least one of weather, advertising, news, sports, entertainment, lifestyle, culture, community, user-generated content, and social networking. In the system and method, the messages are transmitted to the user's handset in accordance with a template.

In an embodiment, a system and method for user-originated mobile media service subscription includes receiving a market selection message from a user indicating an interest of the user in receiving content related to a particular market, transmitting a message in response to the market selection message indicating content categories available in that market, wherein each available content category is associated with a unique command alias, receiving a response to the content categories message including a command alias, wherein the command alias is associated with the selected content category, processing the command alias in accordance with its association with the particular content category, and subscribing the user to a channel for content distribution related to the selected content category. In the system and method, the market selection message is transmitted from a user handset. In the system and method, the market selection message is transmitted by e-mail. In the system and method, the market selection message is transmitted by instant message. In the system and method, the market selection message is transmitted from a web interface. The system and method includes transmitting a channel subscription confirmation message for the indicated content subcategory, including a request for reply to confirm the subscription. The channel subscription message includes at least one of information regarding billing, information regarding the duration of a free trial, information regarding the host of the channels, and information regarding content distribution frequency. The system and method includes transmitting a message indicating content subcategories for the selected content category available in a market, wherein each available content subcategory is associated with a unique command alias. The system and method includes updating a user profile with the user subscription information. The user profile autopopulates when the user transmits a command alias. In the system and method, the messages are transmitted via at least one of SMS, MMS, WAP, a web interface, an e-mail, and an instant message.

In an aspect of the invention, a system and method for multi-modal mobile media services includes delivering a message including content to a user handset, associating an offer for additional content with the message, associating at least one request for response with the offer, wherein the request for response is associated with a mode for accessing the additional content, and transmitting the additional content via the mode indicated by the response. In the system and method, the additional content may be accessible via at least one of SMS messaging, a WAP link, a click-to-call link, content from another channel, instant messaging, Internet search, and an Internet page. In the system and method, the content may also be accessible by at least one of SMS messaging, a WAP link, a click-to-call link, content from another channel, instant messaging, e-mail, Internet search, and an Internet page. In the system and method, transmitting may include accessing a WAP interface. In the system and method, transmitting may include accessing an internet browser. In the system and method, transmitting may include accessing a telephony function. In the system and method, transmitting may include accessing an e-mail application. In the system and method, the request for response includes a unique command alias. The command alias may be at least one of a number, a letter, multiples of letters, short words, and a number and a letter. The command alias may increment with each request for response. The command alias may indicate a desire to receive all available content associated with the message. The command alias may indicate that no further messages should be sent. In the system and method, the short form command indicates that the user should receive a phone call. The short form command alias may be persistent for a defined period of time. The short form command alias may be persistent until a set of command aliases allocated to at least one of the user and channel has been exhausted. The short form command alias may be unique to at least one of an individual user, a set of users with similar subscription profiles, a channel, and each channel to which a user is subscribed. Interpreting the command alias may be done without regard to at least one of the channel the user is currently receiving messages from, a message the user received, and when a message was received by a user. In the system and method, the content of the message may be transformed for delivery to the handset. In the system and method, the message content relates to at least one of weather, advertising, news, sports, entertainment, lifestyle, culture, community, user-generated content, and social networking.

In an aspect of the invention, a method of advertising on a mobile media services platform includes delivering a message including content to a user handset, associating an advertisement with the message, offering the user related advertisement information from within the advertisement, associating at least one request for response with the offer, wherein the request for response is associated with a method of accessing the related advertisement information, and transmitting the related advertisement information via the method indicated by the response. In the method and system, the initial advertisement is delivered via at least one of SMS, MMS or email and contains a link to additional advertisement information on a WAP content page. The WAP advertisement solicits an email address for the delivery of additional advertisement information via email. The email advertisement provides links to additional advertisement information on a Web page intended for delivery to a PC. In the system and method, the initial message content is the advertisement. In the method and system, the advertisement is associated contextually with the content. In the method and system, the related advertisement information is associated contextually with the content. In the method and system, the related advertisement information is accessible on at least one of the Internet, a Web search page, Internet Yellow Pages, mobile search, SMS, WAP, directory assistance, an instant message, a click-to-call link, another channel, e-mail, and a podcast. In the method and system, transmitting includes accessing a WAP interface. In the method and system, transmitting includes accessing an internet browser. In the method and system, transmitting includes accessing a telephony function. In the method and system, transmitting includes accessing an e-mail application. In the method and system, the request for response includes a unique command alias. The command alias is at least one of a number, a letter, multiples of letters, short words, and a number and a letter. The command alias increments with each request for response. The command alias indicates a desire to receive all available content associated with the message. The command alias indicates that no further messages should be sent. In the system and method, the short form command indicates that the user should receive a phone call. The command alias is persistent for a defined period of time. The command alias is persistent until a set of command aliases allocated to at least one of the user and channel has been exhausted. The command alias is unique to at least one of an individual user, a set of users with similar subscription profiles, a channel, and each channel to which a user is subscribed. Disambiguating the command alias is done without regard to at least one of the channel the user is currently receiving messages.

In an aspect of the invention, a system and method for providing mobile media services includes a content management platform for acquiring, processing, publishing, editorializing, transforming, and delivering content to user handsets, a subscriber acquisition platform, in communication with a subscription management platform, for acquiring and managing subscribers of the mobile media service, a subscription management platform in communication with the content management platform for subscription management, and a user interface for setting preferences, modifying, developing, and interacting with at least one of the content management platform, subscriber acquisition platform and subscription management platform. In the system and method, the subscription management platform includes a billing facility. In the system and method, the subscription management platform includes a command disambiguation facility. In the system and method, the subscription management platform includes a search facility. In the system and method, the subscription management platform includes an advertisement integration facility. In the system and method, the subscription management platform includes an analytics facility. In the system and method, the subscription management platform includes a server-side session management facility. In the system and method, the subscription management platform includes a profile creation and management facility. In the system and method, the user interface is used to generate and manage a user profile. In the system and method, the user interface includes a toolbar. In the system and method, the user interface includes a menu. In the system and method, the user interface includes content authoring tools.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 15 depicts a method for an advertising campaign that can be deployed across SMS, WAP, e-mail, and the Web.

DETAILED DESCRIPTION

Media services may comprise content delivery via a mobile platform. User engagement may be facilitated by developing locally produced, personalized channels for delivery of relevant content. The mobile platform may enable building mobile-oriented communities around original content. Content may be local, authentic, relevant, insider, original, aggregated, a multi-modal mash-up, and the like.

Throughout this disclosure the phrase "for example" means "for example and without limitation." Generally, any and all examples may be provided for the purpose of illustration and not limitation. Throughout this disclosure, the term "content" may refer to feed-driven content; editorial-driven content; content that is associated with a feed, author, editor, and so forth.

Figure 1:
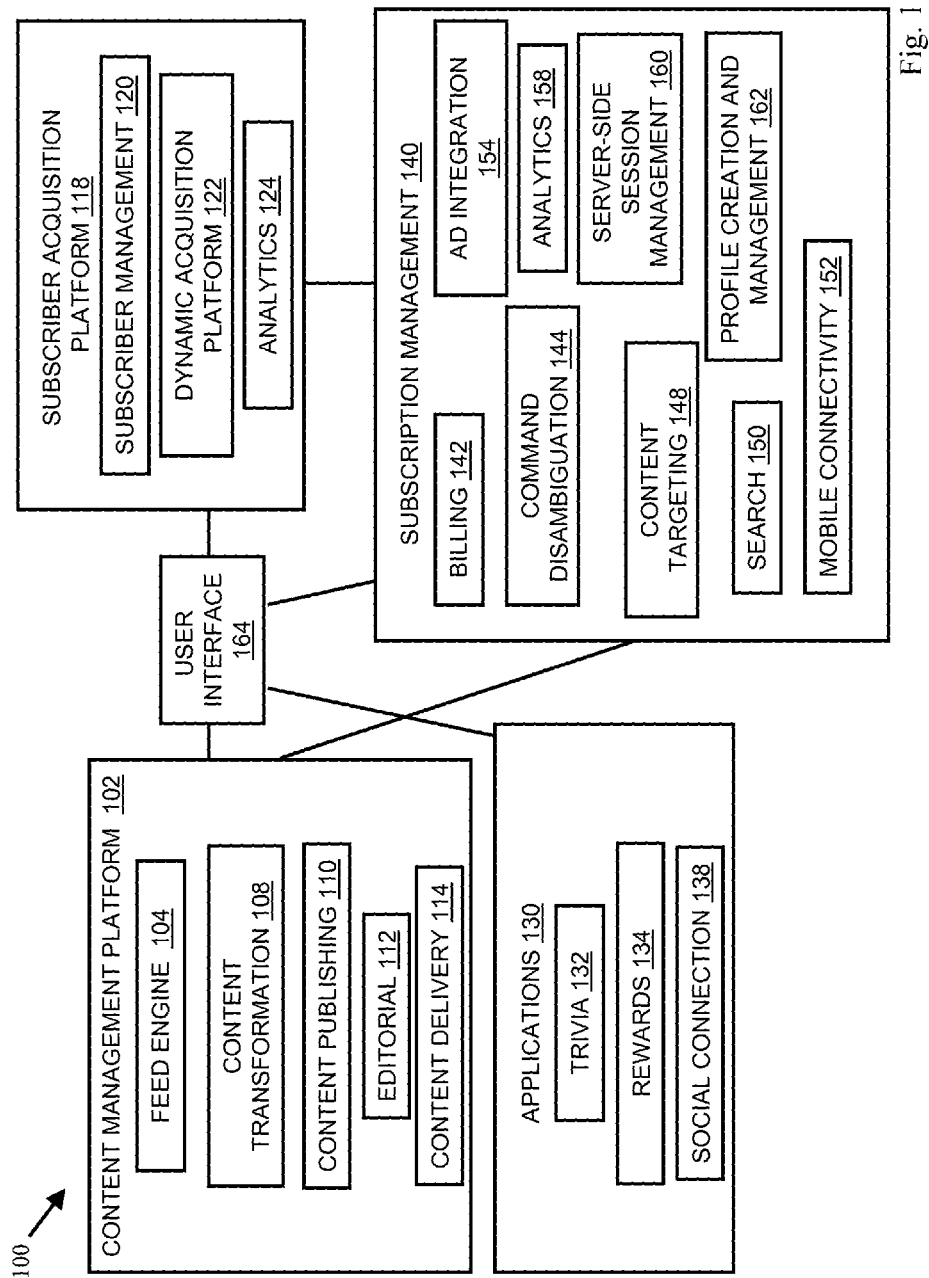
FIG. 1 depicts a platform for mobile media services.

Referring to FIG. 1, a content management platform 102 may comprise a feed engine 104, content transformation technologies 108, content publishing 110, editorial creation and management 112, and content delivery 114. A feed engine 104 may receive and process feeds for content delivery 114 to a plurality of channels. Feeds may be national, such as and without limitation, a weather feed from The Weather Channel, a sports feed from Stats, Inc. or TSN, a lifestyle feed from HGTV, and the like. Feed formats may be an RSS feed, an XML feed, an Atom feed, and the like. Feeds may be processed for delivery to mobile devices. For example, to retrieve a text-only feed on a cellular phone, content may be transformed from XML to xHTML, WAP, or the like.

In an embodiment, the content management platform 102 may use a feed engine 104 to provide control of the content being provided to the plurality of channels. The feed engine 104 may utilize a content publication service to organize content received from content contributors, provide edited content version control, distribute the content to the appropriate channel, or the like. In an embodiment, the content publication service may provide import and creation of content material, identification of all key contributors and their content roles, assignment of roles and responsibilities to different content contributors, definition of the content workflow tasks, tracking and management of multiple versions of a single content, publication of content to a repository to support access to the content, textual aspect information of content, or the like. In an embodiment, the content may be published to users as SMS text, premium-rated short messages (PSMS), binary, or the like. In the case of binary, the content may be transmitted as binary to take advantage of the transmission speed of binary and the user's mobile device may convert the binary to textual content.

In embodiments, content delivery 114 may be interactive, content agnostic, rules-based, channel independent, or the like.

In an embodiment, the published content may be user interactive by allowing the user to dynamically alter the narrative of the content. By publishing content that may contain user inputs, the user may be able to indicate to the publishing channel what content should be delivered next. For example, as part of sporting content, the user may respond to an input to send more game content, send only changing scores, send only lead changes, send only the end of game scores, or the like. In this manner, the user may be able to direct the content that is provided to the user and therefore the user may have a unique content experience as compared with other users. In an embodiment, the first provocation message to a user may be sent with user input options to allow the user to indicate the type of follow-up content desired and, therefore, the provocation message may be used as a content starter.

In an embodiment, content may be delivered in independent communication channels. In an embodiment, the user may remain on a single channel during the connection with the content publication service, may connect to one channel and move to other channels during the connection, or the like. For example, the user may connect to a sports channel to get information about a game and may receive a user option to read a sports restaurant review. By selecting to receive the restaurant review content, the user may be connected to a different channel that contains the restaurant review.

As described herein, published content may be larger than can be displayed on one screen of the user's mobile device. The larger content may be linked over more than one display screen using footers and user input options. After reading the first page of content, the user may select to read more related content, stop reading content, read related content, or the like. For example, the published content may comprise five mobile device display pages and may be linked together as a footer across the five pages, allowing the user to page through the content.

In an embodiment, the content may be published in a plurality of channels. Each channel may be for a particular type of content, a particular content provider, for particular advertisements, for particular promotions, or the like. For example, there may be a channel for editorials, sports, news, weather, local information, or the like. When the content is published, the content may be transmitted to the user in a number of different content pages. Content may delivered using a structured, narrative, and/or multi-message approach. The approach may be embodied in a message flow template. For example, the content may have an initial provocation page where a brief amount of information is sent to the user, allowing the user to determine if more information should be sent. The provocation page may contain user inputs to allow the user to indicate if additional information should be sent. The additional information may be a description, information, a review, an introduction, content body, conclusions, or the like.

Figure 5:
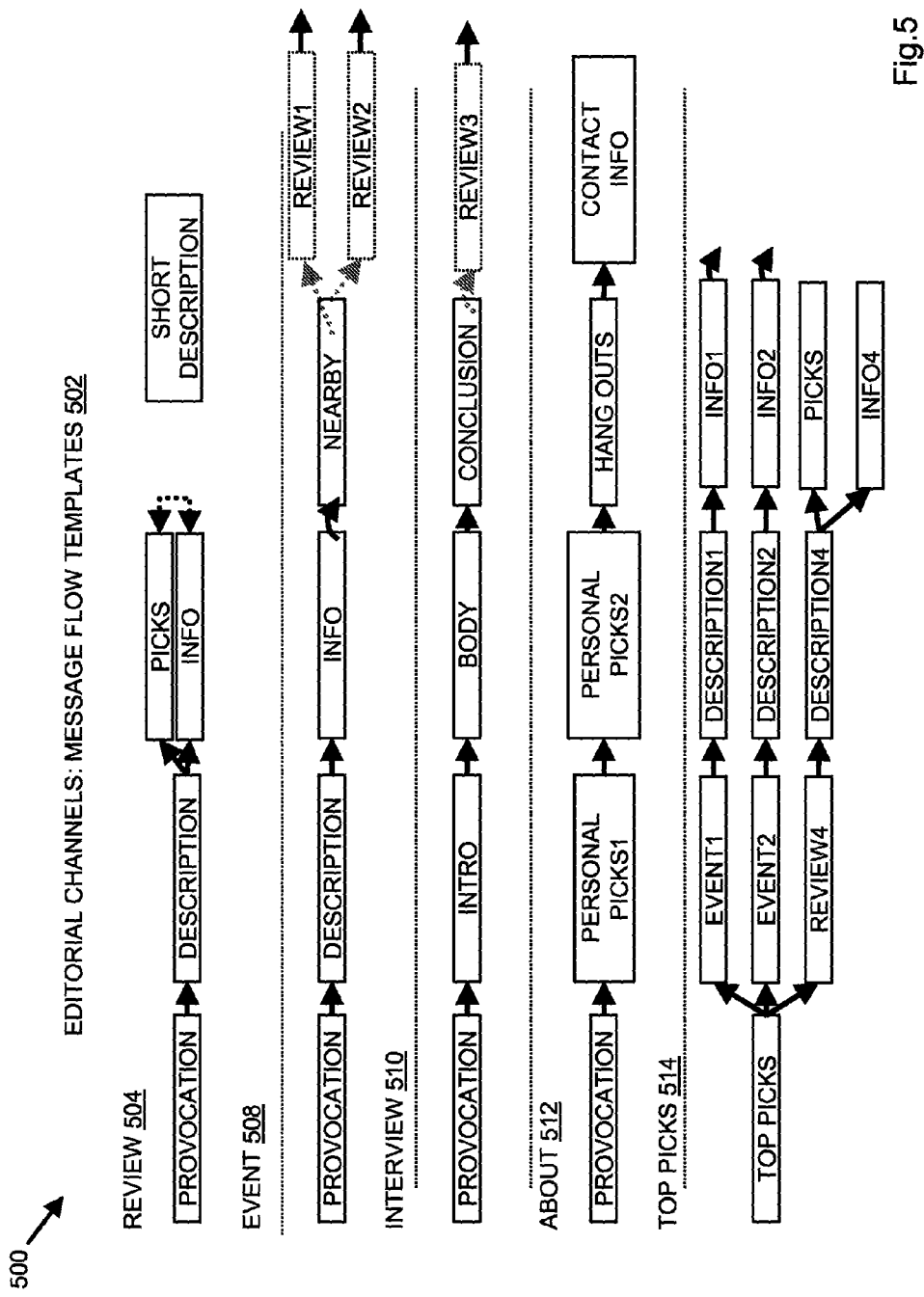
FIG. 5 depicts message flow templates for editorial channels.

Referring now to FIG. 5, in an example of an editorial channel, the user may be sent a provocation page to allow the user to indicate if additional information is desired. The provocation page may be followed up with an introduction page for the editorial content, the editorial content, an opportunity for the user to provide feed back, or the like. In an embodiment, the editorial content may be displayed over several mobile device pages. On any of the presented content pages, the user may be able to choose to accept additional content pages, stop receiving content pages, provide comments back to the editorial, or the like. The comments back to the editorial may be in the form of free form content, selecting from provided options, or the like. Additionally, the user may be presented with survey information and the user may select answers to the survey questions using content provided options. Editorial channel 502 message flow templates may include reviews 504, events 508, interviews 510, about 512, top picks 514, and the like. For example, a review 504 message flow may comprise delivery of a message comprising a provocation, then a description, then picks or information. For example, an event 508 message flow may comprise delivery of a message comprising a provocation, then a description, then information, then what's nearby, then review 1 or review 2. For example, an interview 510 message flow may comprise delivery of a message comprising a provocation, then an introduction, then a body, then the conclusion, and review 3. For example, an about 512 message flow may comprise delivery of a message comprising a provocation, then a personal picks1, then a personal picks2, then hang outs, and contact information. For example, a top picks 514 message flow may comprise delivery of a message comprising a top picks message, then event1 or event2 or review4, then if event 1 was chosen, description1 may be delivered, then information1. If event2 was chosen initially, then description2 may be delivered followed by information2. If review4 was chosen initially, then description4 may be delivered followed by information4.

Those of skill in the art of computer science will appreciate that the message flow templates may be described in terms of a state machine in which the states of the machine are associated with messages and in which the transitions between states are associated with inputs. Such state machines may comprise a start state and at least one end state. In embodiments, the start state may be associated with a provocation message. In embodiments, the finite state machine may be deterministic or non-deterministic. For example and without limitation, restating an example provided hereinabove in terms of the finite state machine, a top picks message flow may comprise a start state; a transition from the start state to an event1 state; a transition from the start state to an event2 state; a transition from the start state to a review4 state; and a transition from each of the event1, event2, and review 4 states to description1, description2, and description4 states respectively; and so on. The start state may be associated with a top-picks message, the event1 state may be associated with an event1 message, the event2 state may be associated with an event2 message, the review4 message may be associated with a review4 message, the description1 state may be associated with a description1 message, the description2 state may be associated with a description2 message, the description4 state may be associated with a description 4 message, and so on. Thus, processing may begin by setting a current state to the start state. The message corresponding to the current state (the top-picks message) may be delivered. An input may be received and a next state may be selected by following a transition that is associated with the input from the current state. For the sake of this example, suppose that the next state is event2. Next, the current state may be set to this next state. Then processing may continue as above, with the message corresponding to the current state (now event2) being delivered. An input may be received and a next state may be selected following a transition that is associated with the input from the current state. For the sake of this example, suppose that the next state is description2. Next, the current state may be set to this next state. It will be appreciated that processing may continue accordingly until the current state is set to an end state. An end state may be a state from which there is no transition out; a state from which there is no transition out that corresponds to an input that is received while in that state; a state that is designated an end state; or any state. It will be appreciated that being in a state may be equivalent to having the current state equal that state.

Figure 7:
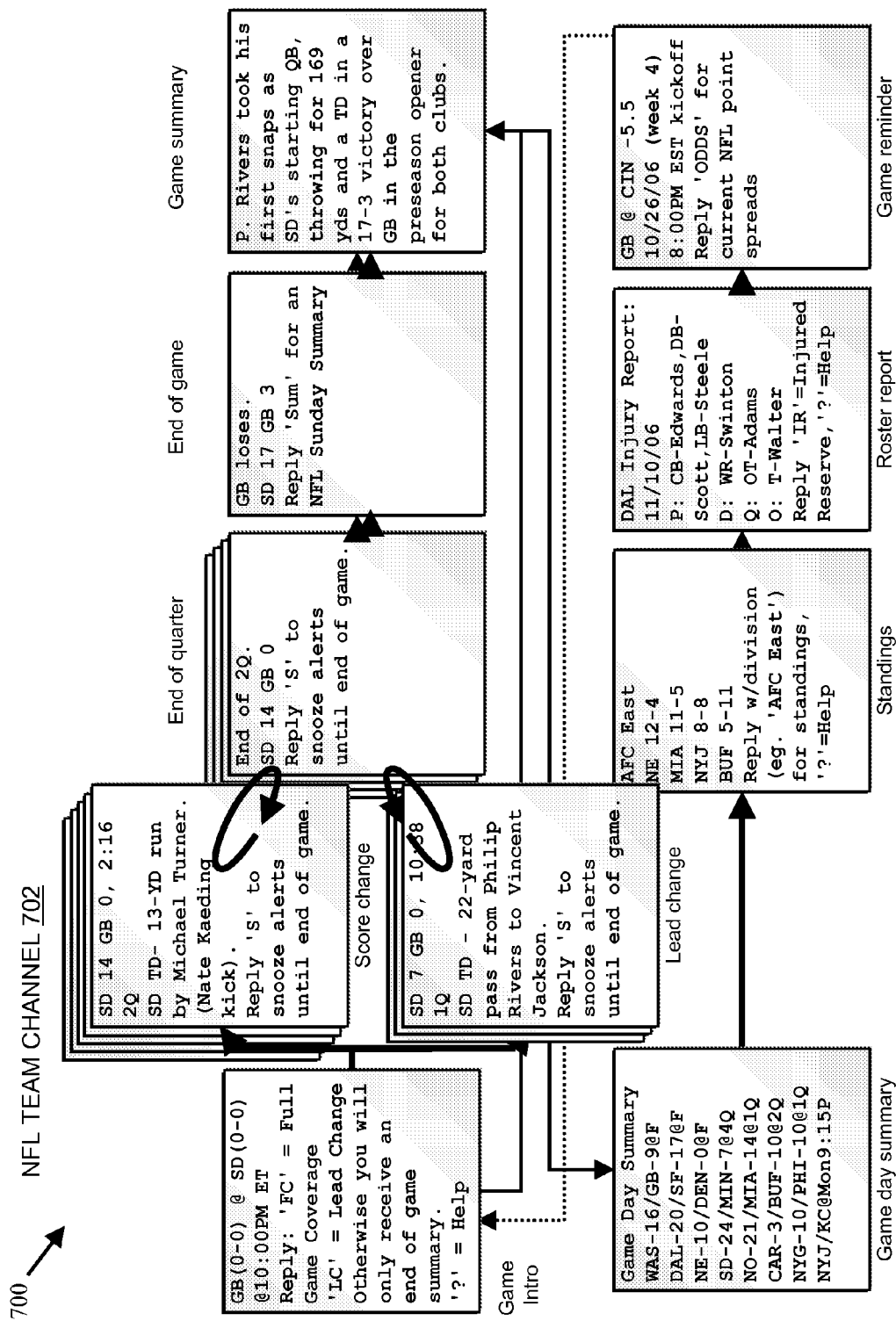
FIG. 7 depicts an NFL team channel.

Another example of content publishing may be sports publishing, as in FIG. 7. The sports publishing may provide game introduction information, lead change alerts, score change alerts, end of time period alerts, standings of teams within a sport organization, team roster information, game time reminders, or the like. The published sport content may provide the user with user inputs to allow the user to determine the next displayed content. In an embodiment, depending on the input options provided, the user may be able to jump to any of the content pages. An example of a sport publication may be the user receiving a game introduction; the user may be able to indicate if more game information should be provided such as game preview information, running commentary during the game, editorial comments about the sports team, or the like. The user may be able to select options that indicate that the user only wants score change alerts, lead change alerts, final game summary, end of quarter message, end of game message, a league summary, a standings message, a game reminder message, or the like. The user may be able to view the current roster of the team, game players that may be injured, fantasy sport information, or the like by selecting these content pages from the user input options.

Figure 8:
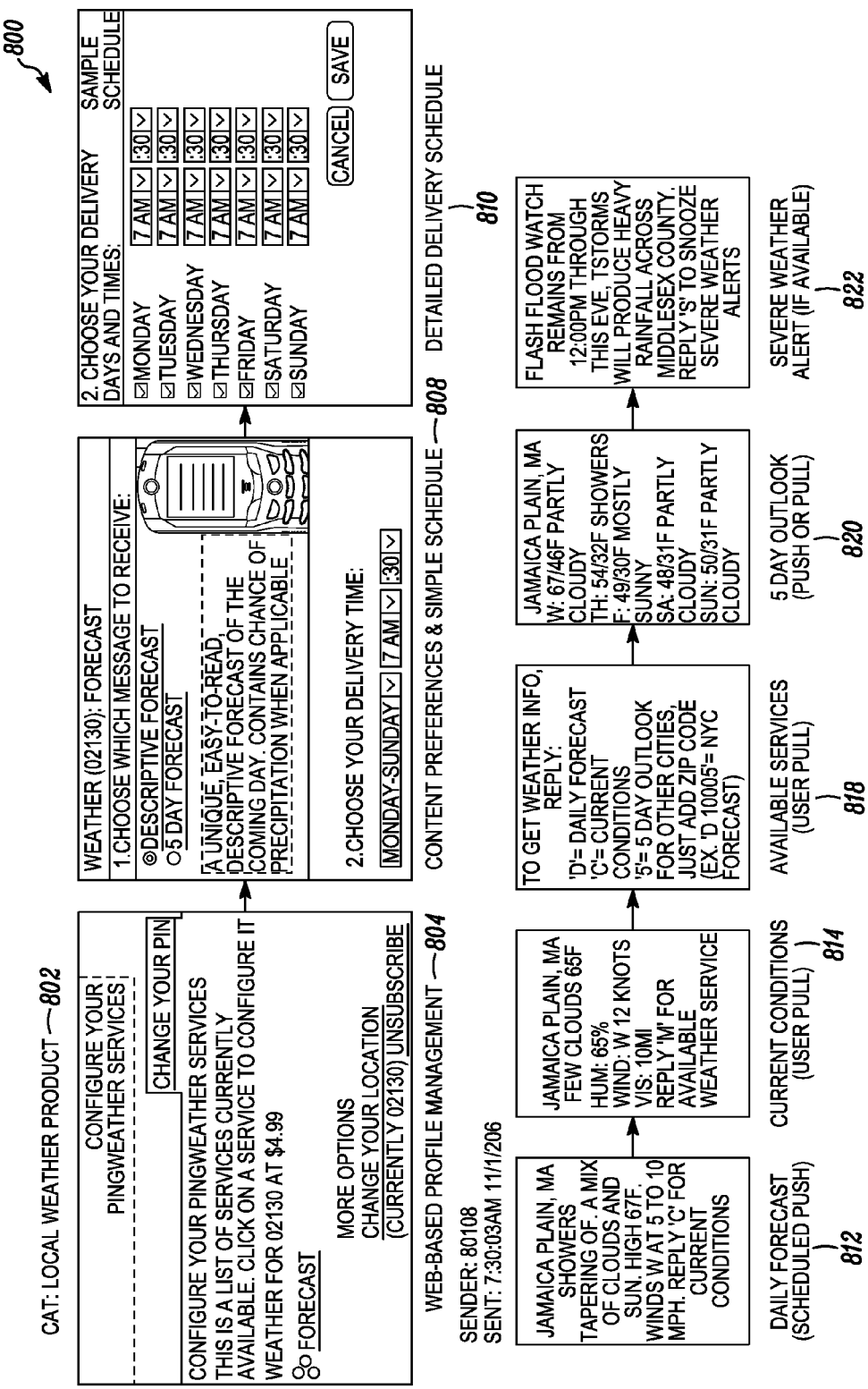
FIG. 8 depicts a local weather product.

Another example of content publishing may be information publishing such as weather information, as in FIG. 8. The user may receive or request weather information; the user may be sent default information such as current conditions, the weekend weather, the five day forecast, the boating forecast, severe weather forecast, or the like. Similar to the other described published content; the user may be presented with user inputs allowing the user to select the type and frequency of information to receive. With the structured narrative approach, content may comprise a response element as pushed messages are designed to begin conversations and extend in directions that the user specifies. For example, referring now to FIG. 8, a weather forecast may be delivered daily 812. The weather forecast may include a sentence requesting a response, such as "Reply 'C' for current conditions". If the user replies with 'C', a message with current conditions may be delivered to the user. If no reply is sent, no further messages may be delivered.

Figure 6:
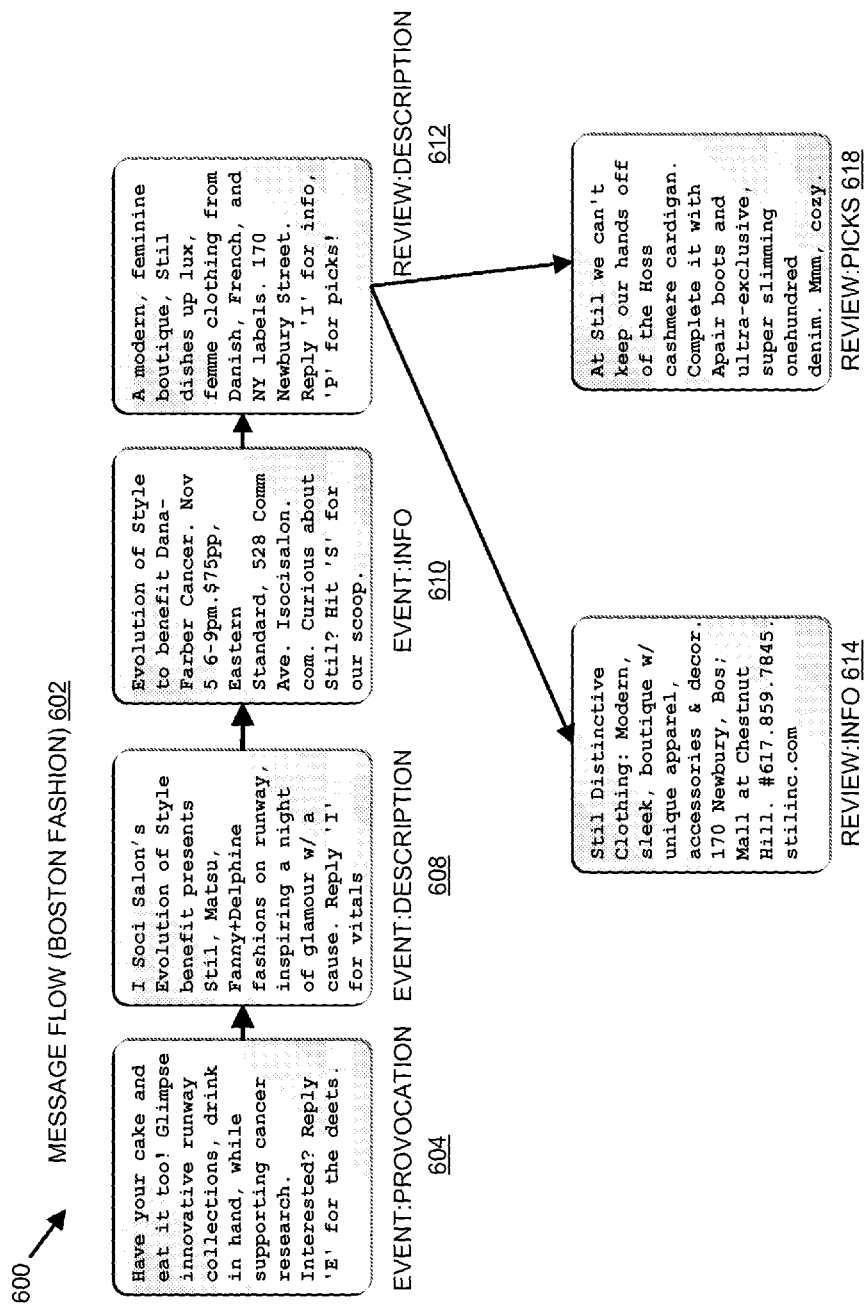
FIG. 6 depicts a sample message flow.

Another example of content publishing may be a local, specialized channel or advertisement, such as a Boston Fashion message flow 602. Referring to FIG. 6, a provocation message 604 may be sent announcing an event. An SMS reply may be requested to receive more information. If a user replies affirmatively, a description message 608 may be sent. An affirmative reply to an SMS request therein may elicit another message, such as an information message 610. An affirmative reply to an SMS request therein may elicit another message, such as a review 612. There may be more than one SMS option, such as that depicted in the review 612. An affirmative reply to an SMS request therein may elicit one of the offered messages, such as information 614 or picks 618.

Someone knowledgeable in the art may understand that there may be many different content types that may be published to a user using many different paging systems. For example and without limitation, content delivery 114 may be facilitated by platforms such as SMS, WAP, MMS, IVR, SMTP, GSM, GPRS, and the like.

The content management platform may also include an affiliate program where content providers are provided with revenue to produce content. The user may be provided revenue by the type of content, the amount of content (e.g. page or word count), as a fixed amount, or the like. Additionally, content providers may receive revenue based on new subscribers signing up for content publishing. Upon signup, the new subscriber may be tracked to a particular channel, a particular content provider, or the like and increased revenue may be provided to the content provider when new subscribers are associated with the content provider's channel.

In an embodiment, the content management platform may store user profiles; the user profile may provide information on the type of content desired, the presentation of the content, the timing of the content, or the like. The transmission of the content to the user may be influenced by the user profile information. In an embodiment, the user profile information may be stored in a database, a table, a file, a spreadsheet, or the like and may include display size information, content type desired, times to send content, or the like. In an embodiment, before transmitting content to the user, the stored user profile may be verified for any user specific display information and the published content may be transmitted as to match the user's display characteristics.

User ranking of content may also influence publishing of content. In an embodiment, when content is published to a user, the user may also be sent input options to rank the content. The received user rankings of the content may be stored in a database, table, file, spreadsheet, or the like to allow for aggregating of the ranking information for the different content channels, individual contents, or the like. The ranking the content may receive from the users may influence the future content, future transmission of the content, the format of the content, the revenue provided to the content provider, or the like.

Specialized content may also be created for content delivery 114. For example, content may be of a staple class such as content related to weather, traffic, news, stocks, travel, and the like. Content may be sports-related, such as content related to baseball, football, basketball, soccer, the Olympics, extreme sports, fantasy sports, and the like. Content may be entertainment-related, such as content related to live music, theater events, concerts, festivals, opera, ballet, and the like. Content may be related to social networking, such as content related to age-based networking, interest-based networking, location-based networking, and the like. Content may be related to lifestyles, such as content related to early adopters, nightlife, beauty, fashion, parenting, green living, campus, hip-hop, rock music, affluent, religious, alternative, military, yuppie, athletic, health-conscious, vegan, and the like. Content may be related to culture, such as content related to the Arts, cuisine, language, religion, pop culture, organizational culture, and the like. Content may be related to sub-genres, such as Boston independent music, New York City fashion, Dallas, Tex. sports, and the like.

Specialized content may comprise reviews, event listings, interviews, Neighborhood Spotlights, About the Author, Quizzes, Dos/Don'ts, fashion trends, blogs, editorials, publications, and the like. Content may be guided narratives. Content may comprise contextually relevant trivia 132 tied to content. Trivia 132 may be a shared service among many channels.

Content transformation 108 may provide for transforming available information into a textual format for delivery to a mobile device. The available information may be provided at a national level, at a local level, at an individual content provider level, by an author, or the like. In an embodiment, the available information may be in a format other than the final text format and may be transformed into the textual format by the information provider or an author, transformed based on a data feed from the information provider, transformed by the individual content provider, transformed based on an information database, or the like.

In an embodiment, the national level information may be information available from a national information source from a website, an RSS feed, a blog, a database, an XML feed, or the like. The information may be news such as from a news organization, a weather organization, a sports organization, a statistics organization, or the like. Additionally, the information may be fashion information, personal information, business information, stock information, event information, or the like. For example, a national news organization may provide an RSS feed containing the top stories of the hour; the information content may be read from the RSS feed and transformed into an SMS message that may be transmitted to a user's mobile device.

In an embodiment, the local level information may be information that is relevant to a town, region, or the like. The local level information may be provided by local enterprises, organizations, events, individuals (e.g. local authors), or the like. In an embodiment, the local level information providers may provide textual content to the content management platform 102 from distribution to the users. For example, a local restaurant reviewer may provide a review in a text format to the content management platform 102 where the information may be transmitted to the user. The information may be provided as stand-alone information, provided as secondary information with primary information, may be provided as additional information on a topic, or the like. For example, the user may receive national information on a restaurant chain and then receive information from one of the local restaurants from the restaurant chain. The local level information may include information for local events, where to get tickets, the times of the event, event sponsors, or the like. It may be understood by one knowledgeable in the art that many different types of local information may be transmitted to a user.

In an embodiment, an individual content provider may be a locally based individual who provides information content to the content management platform 102, a publisher, a newspaper, and the like. The information provided by an individual may be related to the individual's hobby, a subject on which the individual is knowledgeable (e.g. politics), a subject the individual is passionate about (e.g. sports), and the like. In an example, content provided by a magazine publisher may be delivered to a user. In embodiments, users who are also subscribers of the print publication may also be eligible to receive additional content from the publisher.

In an embodiment, an individual content provider may provide original content such as information promoting an event, a political comment, sports information, or the like. All the information may be provided by the individual content provider and may be fed directly to the content management platform 102 for transmission to the users.

In an embodiment, content may be community publishing. For example, a channel may be a community channel. For example, a community may use the channel to relay messages to the community. For example, a Team-In-Training channel may relay messages regarding sponsorship opportunities, training run times, training run cancellations, social gatherings of the team, and the like. In another example, a presidential hopeful may have a channel to relay messages to supporters, constituents, volunteers, and the like.

In an embodiment, an individual content provider may receive an information feed and provide additional information to the information feed, add comments to the information feed, edit the information feed, or the like. For example, an individual content provider may receive sports information from a national or local news feed and add additional information to the feed. If the sports information is about a particular player, the individual content provider may provide additional player statistics, player salary information, player contract information, editorial comments on the players' performance, or the like.

In an embodiment, an individual may receive compensation for providing original content, additional information to the content, or the like. The compensation may include participation in the revenue stream of the provided content, being provided access to events (e.g. tickets), being provided with merchandise, the satisfaction of providing the information, or the like. For example, individuals may receive a bounty per acquisition, a share of channel net revenue, and the like. The individual may be a full time content contributor, a part-time content contributor, an intern content contributor, or the like. Additionally, the individual may be involved in recruiting, training, providing oversight, or the like to other individual contributors. There may be a hierarchy of individual contributors where the individual contributors are organized into organizational levels such as editorial staff, writing staff, content contributors, or the like. For example, individuals may be subject to a central editorial or peer-review to evaluate authored content. Individual content providers may participate in subscriber acquisition 118.

In an embodiment, content may be transformed for display on a user's mobile device that may include text compression, SMS text case correction, adding additional content, providing user input, providing user output, or the like.

In an embodiment, text compression may include removal of unnecessary words within a provided content. In providing content to the small screens of a mobile device, the number of characters may be important to providing a comprehensive content within the specific mobile device screen size. The provided content may be reviewed and edited to provide the desired content using the correct number of characters. In an embodiment, there may be more than one version of the compressed content; the compressed content may be dependent on the receiving mobile device. For example, a PDA may be able to display more characters then a cell phone and therefore the compressed content provided to the PDA may be different than the compressed content provided the cell phone.

In an embodiment, the content transformation 108 may include formatting the number of characters to meet the display capabilities of the user's mobile device, formatting the information by information type, or the like. For example, if the provided information contains 256 characters and the user's device is capable of displaying 128 characters, the content transformation by the content management platform 102 may break the information into two display pages of information. In another example, the information may be categorized into information types such as a title of a story and the story information. A first page may contain the title of the story and may allow the user to provide an indication if the user wants to view the story; the story may be provided on a second page. In an embodiment, the provided information may categorize the information into topics, content type, or the like using tags within an XML feed, RSS feed, data definition, or the like.

In an embodiment, the provided SMS content may be provided with corrected text case for the text such as capitalization after a period, capitalization for recognized names, proper spacing after periods and commas, or the like. The case correction may be an automatic function or a manual function provided by an individual. For capitalization, there may be a database or the like of common names, names of people in the public view, sports names, nick names, or the like where case may be corrected. In an embodiment, if a word is recognized as needing capitalization, the word may be automatically capitalized.

In an embodiment, as described herein, an individual may transform the provided content before the content is transmitted to a user. For example, a sports feed may be modified to add the comments of a local expert, a comedian, an interested individual, or the like. This modification of the content may occur in real time, near real time (e.g. time delayed) or prior to the transmission of the content. For example, content transformation 108 may comprise adding tone, bias, style, and the like to content. For example, a baseball game summary prior to content transformation 108 may read, "Manny Ramirez is hitless in seven at-bats over two games, reaching base only once after drawing a walk." This content may be transformed 108, for example, by an individual content provider who may add a sarcastic tone. After content transformation 108, the content may now read, "If it weren't for drawing a walk, Manny wouldn't have been on base at all in the last two games after going hitless in seven at-bats. However, Manny is still contributing of course, with his all-out hustle in the outfield."

In an embodiment, as part of the transformed content, the user may be provided with an opportunity to give input and output related to the content. For example, the user may be provided with content and the user may be able to provide input to determine if additional information should be displayed. In another example, the user may be able to provide feedback information to the received content. The feedback may be in the form of free form text, selecting from a set of choices, or the like.

In an embodiment, the transformation of content to the user may include formatting the information for the user's mobile device such as display size, aspect ratios, or the like. The formatting information may be stored for each user, may be part of a user profile, or the like. In an embodiment, the user may specify the formatting requirements by indication of the mobile device type during a setup procedure. The storage of the formatting information may be in a database, a table, a spreadsheet, a file, or the like. In another embodiment, the formatting information may be determined as part of the transmitting sequence to the user mobile device. There may be a discovery sequence that determines the user's mobile device capabilities and then transmits the properly formatted content.

In an embodiment, to receive content from certain content providers, the user may need to install a plug-in application in the user's mobile device. The plug-in may provide transformation of content provided by certain content providers into a format viewable on the user's mobile device. In an embodiment, the plug-in may be applied to any of the connectivity types (e.g. SMS, WAP). For example, an NBA provided content may be in a format that is unique to the information the NBA is providing. The plug-in may transform the NBA XML provided content into a channel format that may be displayed on the user's mobile device. Additionally, there may be a dictionary associated with the plug-in application that may contain common words used, names of players, interpretation of statistics, or the like. The dictionary may allow the content to be properly case corrected before being published to the user.

Continuing to refer to FIG. 1, a subscriber acquisition platform 118 may comprise subscriber management 120, a dynamic acquisition platform 122, analytics 124, and the like. A dynamic acquisition platform 122 may allow subscriptions, payment, setting preferences, and the like from a web page, a mobile device, a phone, a pager, and the like.

Figure 3:
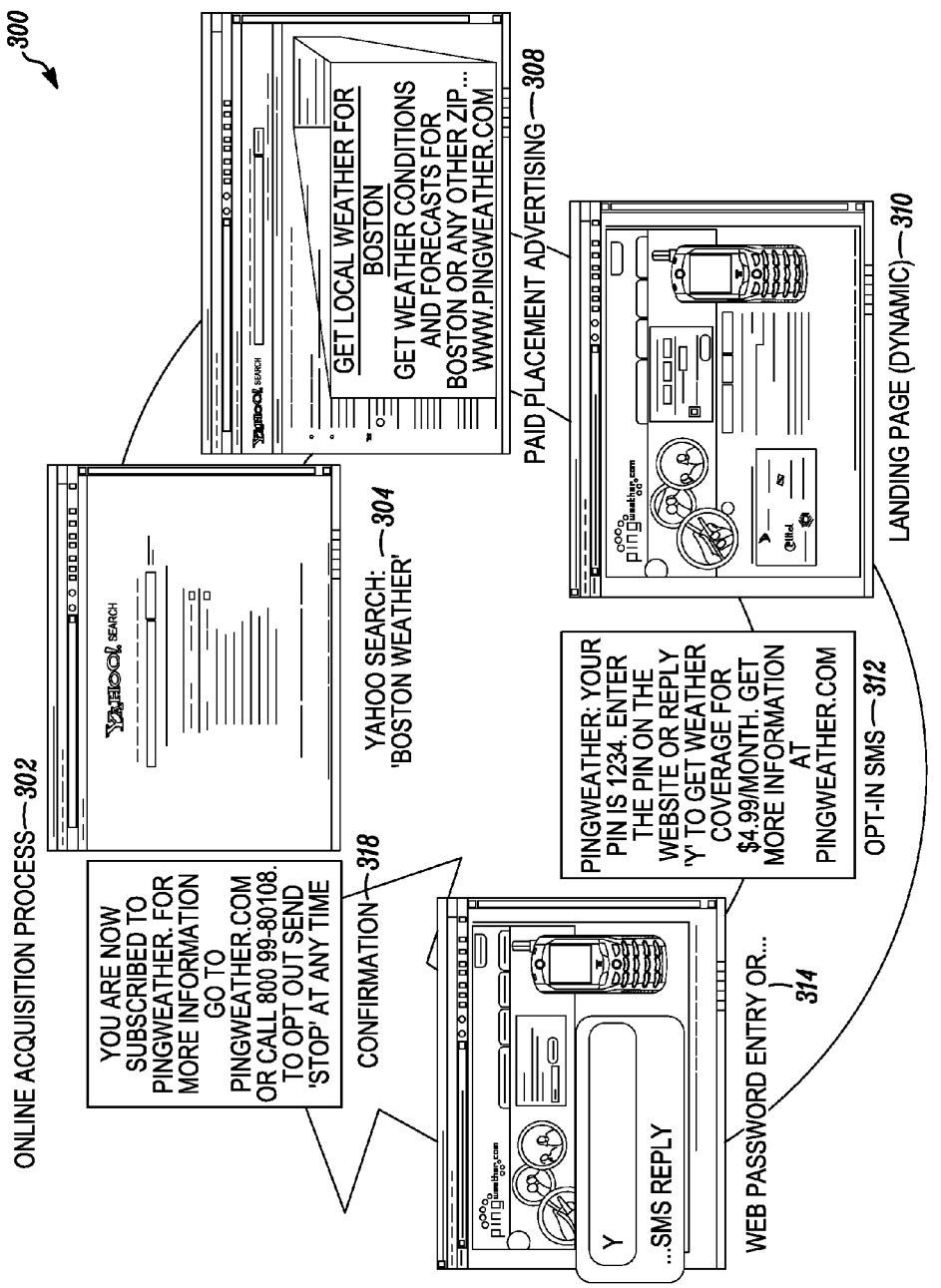
FIG. 3 depicts the online acquisition process.

In an embodiment, acquisition of users to the content publication service may include dynamically presented advertisement, sending a text message subscription request, or the like. Dynamic advertising may include providing landing advertisement pages as a result of a keyword search, a paid advertisement placement on a website, an SMS message to the user, an affiliate advertisement, or the like. Referring now to FIG. 3, an online acquisition process 302 may comprise a web search 304. For example, a user may search for 'Boston weather' on a web search engine 304. The search results may be displayed on a web page and may be associated with a paid placement advertising 308. When a user may click on the paid placement advertising 308, a dynamic landing page 310 may be activated. The dynamic landing page 310 may allow a user to subscribe to a channel on the web page. Alternatively, an opt-in SMS 312 for a channel subscription may be sent to a user. In any event, a web password entry or an SMS reply 314 may confirm subscription to a channel. Confirmation 318 may be sent via an SMS message.

In an embodiment, the user may be presented with an advertisement for the content publication service as a result of a keyword search on the Internet. For example, the user may be presented with an advertisement for the content publication service when the user searches for mobile device publications. Additionally, the user may be presented with publishing service advertisements when searching on the Internet for information that may be related content that is published as part of the mobile device publication service. For example, the user may search for weather information and the user may receive an advertisement for the mobile device weather publication service.

In a similar manner, the dynamic advertisement may be a paid placement advertisement such as placing a mobile device content publication website advertisement as a result of the user's web search on a web browser search engine. Paid placement advertisement may be placed on the search engine results if there is a search for a subject in which the content publication service provides content. For example, if the user searches for sporting news, a paid placement advertisement may be presented to the user for the mobile device content sport news where the user may subscribe to the content publication service.

In an embodiment, the user may receive a direct SMS message as an advertisement when the user receives other SMS information. For example, the user may receive an SMS message from another enterprise and a mobile device publication service advertisement may be presented with the enterprise SMS message to direct the user to a website to subscribe to the content publication service, to send an SMS message to subscribe to the content publication service, or the like.

In an embodiment, there may be a mobile device plug-in for dynamic mobile device advertising. The advertising plug-in may provide transformation of advertisement content received from the channels to be formatted to the connection type with which the user has connected to the channel. For example, if the user is accessing the channel using WAP, the advertisement may be formatted to be displayed on the WAP interface. In an embodiment, the transformation may include color palette, fonts, placement, images, audio, video, or the like. In an embodiment, during communication on a channel, the user may receive a plurality of different advertisements that may be dynamically displayed to the user. In another example, if the user is connected with SMS, any audio, image, video, or the like may be stripped from the content before the advertisement content is published, may be stripped at the user's mobile device by the plug-in, or the like.

In an embodiment, the content publication service may use online and offline marketing techniques to promote the content service. As part of online marketing, the content service may provide advertisement on search engine result pages. The advertisement may be a paid advertisement on the search return page, may be a paid search return, a paid advertisement on a webpage, or the like. In a similar manner, the marketing may include providing paid advertisement on a mobile device WAP browser as part of a user keyword search or web browsing.

In an embodiment, the content publication service may form a partnership with an enterprise to maximize the return of advertisement cost. In one example, a partner may provide advertisement space while the partner may receive advertisement as part of the content service published content.

In an embodiment, the content publication service may use an affiliate to provide visibility of the content publication service channels. For example, a content contributor may have a store front where the content contributor may advertise the channel content for the content service. The displayed information may include a list of codes that may be texted to subscribe to the content service, to receive certain channels, or the like. In an embodiment, the content contributor may have certain text codes that may provide tracking from which content contributor the new subscriber received information.

In an embodiment, the user may be able to send an SMS text message to subscribe to the content publication service. The user may receive an SMS message from a short message peer-to-peer (SMPP) protocol message inviting the user to subscribe to the content publication service. After receiving the SMPP message, the user may be able to send a return SMS message to subscribe to the content publication service.

In an embodiment, the content publication service may advertise for users using mobile pay-for-performance where advertisements are paid at a rate in which they attract users to subscribe to the content publication service. Additionally, the content publication service may use hybrid analytics to allow placement of advertisement in locations that match user website visitations with user profiles to provide more directed advertisements.

Continuing to refer to FIG. 1, applications 128 may comprise trivia 132, rewards 134, a social connection 138, and the like. In an embodiment, users that receive published content over one of the content providing channels may also communicate with other users on a social interest channel. Social interest channels may include sports, hobbies, interest, food, cars, or the like. In an embodiment, users may join a social interest channel, may qualify for the social interest channel, may be invited to the social interest channel, or the like. The social interest channel may provide a format where users may post content on the channel that may be of interest to the other users accessing the social interest channel. The format may be a chat room, a place to post content about the social interest, or the like. The user may be able to post content, provide answers to a posted content, select different content to read, or the like. An example of qualifying for a social content channel may be a sports fan with a high score on a sports trivia questionnaire. For example, users indicating an interest in the Boston Red Sox who may also have scored high in trivia 132 may become aware of a potential social connection 138. Making the social connection 138 may be an automatic or a manual process. Rewards 134 may be associated with a social connection 138.

In an embodiment, there may be a trivia application that may present trivia questions to users. The trivia may be presented as a set of questions, single questions at the end of a published content, by request from a user, or the like. In an embodiment, the trivia may be related to the user's received published content, of a general nature, related to the content published on a channel, or the like and may be used as the basis of a rewards system, just for fun, or the like. The user may request to be part of a trivia application, may receive trivia automatically with content, may request to be omitted from trivia, or the like. The trivia may be related to the published content such as published content just received by the user. For example, content related to a baseball game may prompt a trivia question related to a player's statistics, won/lost records of pitchers, or the like.

In an embodiment, there may be a rewards 134 application that tracks the users participation on content channels and provides rewards based on certain metrics. For example, after responding to a certain number of restaurant reviews, a user may receive a reward of a discount meal at one of the reviewed restaurants. In the same manner, rewards may be for tickets, merchandise, discounted subscriptions, or the like. Rewards 134 may be accumulated, transferred, deferred, accessed, converted, sold, bought, and the like.

Continuing to refer to FIG. 1, subscription management 140 may comprise billing 142, command disambiguation 144, content targeting 148, search 150, mobile connectivity 152, ad integration 154, analytics 158, server-side session management 160, profile creation and management 162, and the like.

In an embodiment, as part of a subscription management system, content may be targeted to a user based on the received content, a user profile, user response to content, user location, or the like. The subscription management system may target information to the user to maximize the user's response to the published content, to an advertisement, or the like. The targeted information may be presented in the footer of the published content, the footer being the space remaining after the body of the published content. In an embodiment, the footer may include advertisement, user input request, opinion surveys, or the like. For example, the user may request and receive published content on severe weather in the area and may be presented with a request to check for event cancellations as part of the footer. In another example, if the user may request weather information, the user may be presented with vacation information, gardening information, clothing advertisements, beach reports, sport reports, UV reports, or the like.

In an embodiment, the footer information may be based on the number of characters remaining to be displayed. For example, if there are fifteen characters left for the footer after the published content is received, the user may be presented with the most appropriate information that will fit within the fifteen characters. The footer may be a sport score with the name of the enterprise providing the score, the current weather with the service providing the weather, or the like. Additionally, the footer may be an option for the user to request more information. The additional information may be related to the received published content, an advertisement, or the like.

In an embodiment, the footer information may also be related to the user's profile, the user's location, or the like. For example, the user's profile may contain information on the user's interest and the interest may be used to target information to the user such as sports information, concert information, shopping information, or the like.

In an embodiment, the footer information may be related to the location of the use. For example, the user may be in downtown Boston, and the user may receive advertisements for stores within the downtown area. In an embodiment, the users profile and location information may be combined to provide targeted footer information to the user.

In addition to footer information related to the content of the published content, the user may be presented with periodic footer information from a paid advertiser. An advertiser may select to transmit messages to all users, selected users, selected users based on a user profile, or the like on a periodic basis. For example, an advertiser may select to send a message to all users once a day during a certain season.

In an embodiment, the subscription management system may manage the revenue stream for the content publication service by managing and tracking user subscriptions, managing advertisers, managing partnerships, tracking analytics, managing loyalty programs, or the like.

In an embodiment, the subscription management system may manage user subscriptions by sending reminders for subscription payments, tracking payments, tracking due dates for payments, or the like. In an embodiment, the information sent to a user may be a stand-alone message, part of the footer, or the like. The user may be able to respond to the subscription request to indicate a continuation or cancellation of a subscription. Billing 142 may comprise charging users a fee for access to content. The fee may be a per-use fee, a recurring subscription fee for a single channel, a recurring subscription fee for a subset or genre of channels, and the like. Recurring fees may be daily, weekly, monthly, yearly, and the like.

In an embodiment, the subscription management system may track loyalty programs for certain mobile devices, for certain mobile device providers, or the like. For example, a loyalty program may be provided for a certain provider for a certain length of time and the subscription management system may track the number of users to subscribe to the content publication service from the loyalty program.

In an embodiment, the subscription management system may track a la carte access of users to the content publication service. Some users may subscribe by the day, pay per use of certain information channels, or the like. In an embodiment, the subscription management system may provide subscription information to the a la carte users as at a set period. The user may be able to pay for the a la carte subscription at the time the service is requested, at the end of a certain period, or the like.

In an embodiment, the subscription management system may track the advertisement revenue stream by tracking what advertisements were sent to users and at what advertisement rate. As advertisement may be sent to the user as stand-alone content, as the footer, or the like the subscription management system may track the value of the advertisement. In an embodiment, the advertising cost may be based on the number of characters transmitted, by the number of pages transmitted, if the advertisement was the main content, if the advertisement was a footer, or the like. In an embodiment, the subscription management system may be able to aggregate reports on the value of the advertisement for each advertising enterprise, for all advertising enterprises, for a type of advertisement, or the like.

In an embodiment, the subscription management system, may track the partnership revenue stream by tracking advertisements by partners, advertisements for partners, or the like. Billing 142 may comprise charging advertisers a fee for access to the mobile advertising platform. Whenever a user may view or hear, or otherwise have an "impression" of, the advertisement, a fee may be assessed.

In an embodiment, the subscription management system may provide analytics across more than one media (e.g. SMS and website), by keyword request, by subscription type, by traffic routing, or the like. Users may subscribe or be directed to the content publication service by starting at a website and transition to receiving information on a mobile device. The subscription management system may be able to provide analytic information for the website visit and published content received by the user to provide information of the effectiveness of the subscription method for attracting users.

In another example of analytic information, the subscription management system may provide keyword information related to particular advertisement campaigns, promotions, provided content, or the like. The subscription management system may be able to aggregate the user request for information by keyword, by keyword associated to a particular type of content, by keyword related to a certain type of advertisement, by keyword related to a certain advertisement, or the like. For example, to participate in promotions utilizing a mobile device, a user may send an SMS with keywords to an SMS address. For example, a user may text the term 'BOS' to 80108, thus alerting the system that the user is participating in the BOS campaign, which may be related to music promotions in the Boston area.

Additionally, the subscription management system may be able to track routing information of content to a user. In an embodiment, the subscription management system may aggregate historical routing information for certain periods of the day, provide real time routing information, provide information regarding routing rates by mobile device provider, provide information regarding routing rates by user, or the like. In an embodiment, the routing information may be used to make long term adjustments to the publishing of content to the user or real time adjustments in the routing.

In an embodiment, a user may be able to subscribe to the content service by texting a code. In texting the code to the content service, a basic profile may be established and the user may be able to connect to published content on any of the provided channels. As described herein, as a new user connects to content, connects to channels, goes to locations, or the like, a user profile may be populated or modified to fit the user's content preferences.

In an embodiment, a user may be able to connect to a channel by texting a code to the content publication service. The texting of certain codes may provide connection to certain content channels.

In an embodiment, there may be more than one method of interpreting commands from the user such as natural language commands, a structured command language, interpretation of a partial word as a command, or the like. Command disambiguation 144 may be associated with inference and disambiguation of commands. Inference and command disambiguation may be automatic or manual. After being provided with information content, the user may be able to provide return commands to indicate further action to be taken. For example, after receiving the first page of the content, the user may be able to provide input to indicate if additional information should be transmitted to the user. In an embodiment, the user commands may be in response to the provided content or any provided additional information such as an advertisement. However, if two or more messages are sent to which a user may be responding to and both messages indicate that the same character should be used to respond to a message, such as 'D' for Details, it may be unclear which of the two messages the user actually responded to when a 'D' may be received by the command disambiguation 144.

Command disambiguation may involve a first in, last out approach. In an embodiment, a user may be sent more than one message in which a request for reply, an option to link to content, or the like are included in both messages. When a reply is returned where it may be ambiguous as to which message the user intended to reply to, the command disambiguation 144 may associate the reply with the last message sent. Command disambiguation may involve a first in, first out approach. In an embodiment, a user may be sent more than one message in which a request for reply, an option to link to content, or the like are included in both messages. When a reply is returned where it may be ambiguous as to which message the user intended to reply to, the command disambiguation 144 may associate the reply with the first message sent.

Command disambiguation may involve associating a command alias with a command. Command disambiguation may involve the command disambiguation 144 creating command aliases for each user. In an embodiment, numbers, such as numbers from 1 through 99, 11 through 99, or the like may be used as the command aliases when a request may be sent and/or acted upon. The associated command alias may increment for each request for reply. For example, a user may be sent a message wherein a request for a reply, an option to link to content, or the like are included in the message. A unique alias which may increment numerically for each possible reply may be associated with that reply. In an embodiment, the number '1' may be assigned to a request for one item of content, the number '2' may be assigned to a request for a different item of content, the number '3' may be assigned to a request for all content available, the number '4' may be assigned to a link to a third party website, the number '5' may be assigned to an indication that no further messages should be sent, and the like. In this example, the user may select a number from 1 through 5 to indicate their reply. Alternatively, no reply may be sent in response to a request. When a subsequent message may be sent to the same user wherein there may be a request for a reply, an option to link to content, or the like are included in the message, a unique alias for each possible reply may be associated with that reply. The command disambiguation 144 may assign the next possible command alias to a possible reply. Continuing with this example, the number '6' may be assigned to a request for one item of content, the number '7' may be assigned to a request for a different item of content, the number '8' may be assigned to a request for all content available, the number '9' may be assigned to a link to a third party website, the number '10' may be assigned to an indication that no further messages should be sent, and the like. In this example, the user may select a number from 6 through 10 to indicate their reply. Alternatively, no reply may be sent in response to a request.

In an embodiment, the set of command aliases may be defined for an individual user or for a set of users with similar subscription profiles. In an embodiment, the set of command aliases may be defined for each channel. In an embodiment, the set of command aliases may be defined for each channel to which a user may subscribe. For example, the command disambiguation 144 may allocate numbers 1 through 99 for each user as the set of command aliases. In an embodiment, the command alias link to a possible reply may be persistent. The persistent link may expire after a defined period of time, such as for one week, two weeks, or the like. The persistent link may expire after the allocated set of command aliases has been exhausted, such as when all numbers from 1 through 99 have been used and the assigning of command aliases may begin again with 1. For example, if the reply is "11" from a particular individual, the command associated with that reply may be different for other users, may be different for the same user if sent at another time, such as for example, when the persistent link expires, or the like.

In an embodiment, the command alias may be letters. The command alias may increment alphabetically for each possible reply. For example, the command alias may increment from A through Z. In an embodiment, after reaching the end of the alphabet, the command disambiguation 144 may continue to increment the command alias using multiples of each letter, such as AA, BB, and so on. In an embodiment, the command alias link to a possible reply may be persistent. The persistent link may expire after a defined period of time, such as after one week, two weeks, or the like. The persistent link may expire after the allocated set of command aliases has been exhausted, such as when all letters from A through Z have been used and the assigning of command aliases may begin again with A.

In an embodiment, the command alias may be short words or codes. The words may be arbitrary. The command alias may be a new, arbitrary word for each possible reply. In an embodiment, the command alias link to a possible reply may be persistent. The persistent link may expire after a defined period of time, such as after one week, two weeks, or the like. The persistent link may expire after the allocated set of command aliases has been exhausted, such as when all arbitrary short words have been used and the assigning of command aliases may begin again with a first arbitrary short word.

In an embodiment, the command alias may be a combination of letters and numbers. For example, multiple messages may have requests for replies where the reply would be 'D' for details. To uniquely identify the command as being associated with a particular message, a number may be added to the 'D'. For example, instead of the request for reply reading 'Reply D for Details', it may altered to read 'Reply D3 for Details'. The numbers added to the request for reply may increment, such as for example from 1 through 99, 1 through 999, or the like. In an embodiment, the command alias link to a possible reply may be persistent. The persistent link may expire after a defined period of time, such as after one week, two weeks, or the like. The persistent link may expire after the allocated set of command aliases has been exhausted, such as when all numbers in a command alias set have been used to alter the request for reply.

In an embodiment, command disambiguation may enable navigation to content in an unstructured fashion. For example, instead of receiving content according to a message flow template, such as the editorial channel 502 message flow, review 504 message flow, event 508 message flow, interview 510 message flow, about 512 message flow, and top picks 514 message flow described herein, content may be requested and/or received in any order, at any time, and from any channel. Content may be associated with a unique command alias such that a request for content may be done without regard to the channel the user may currently be receiving messages from, a message the user may have received, when a message may have been received by a user, and the like. For example, a user may receive a message with a reply for request reading 'Reply 2 for the Red Sox box score'. Having previously requested the box score in reply to another message, the user may know that the subsequent content offered may be the current league standings. Thus, the user may preempt having to receive the Red Sox box score in order to get a request for reply related to the league standings and instead may reply with the number '3' knowing that the next piece of content may be associated with a command alias incremented by 1.

Figure 9:
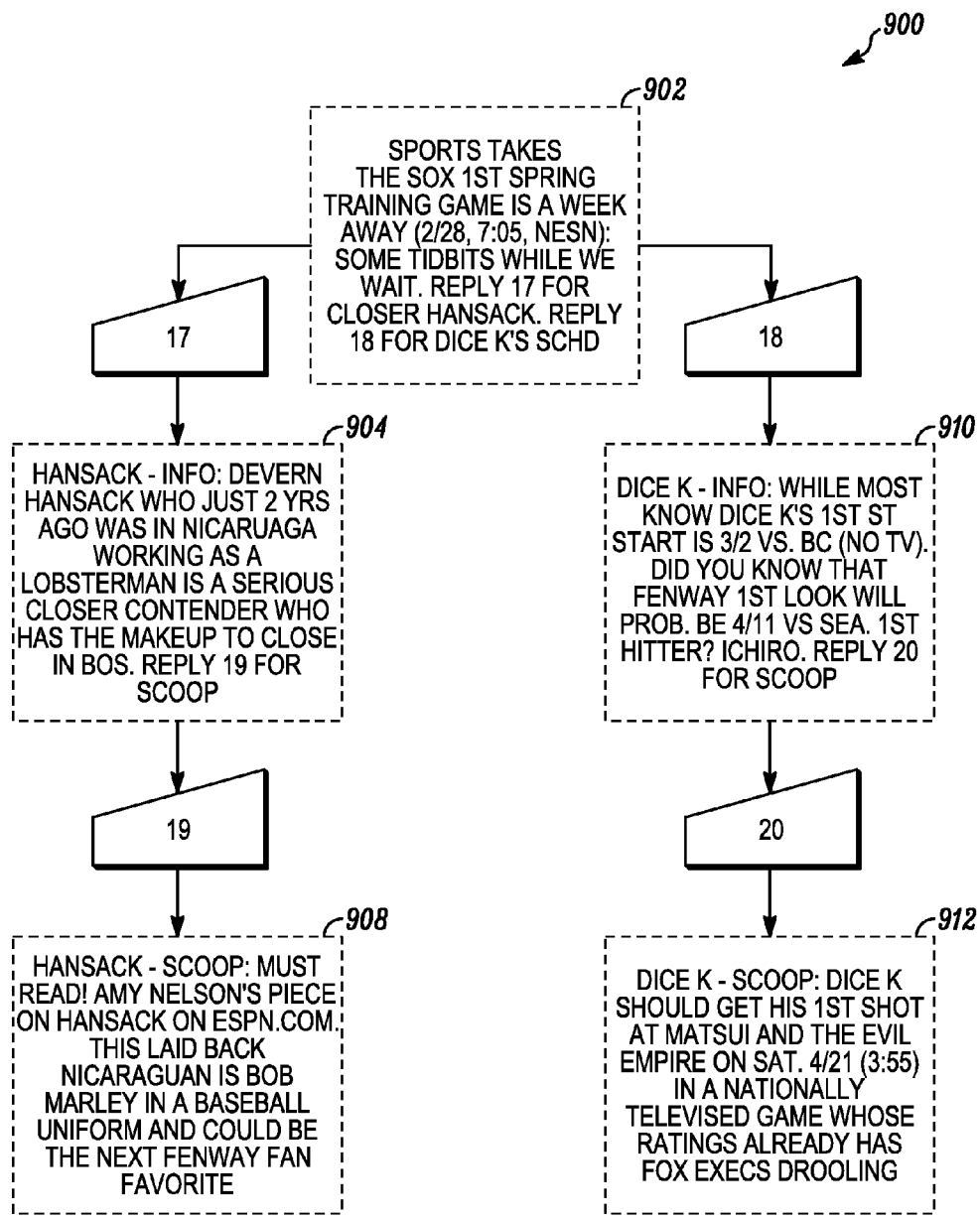
FIG. 9 depicts a sample message flow demonstrating command disambiguation.

Referring to FIG. 9, depicted is an example of a message flow where command disambiguation is demonstrated. A provocation message 902 may be sent to a user with a message header, the message, and requests for reply reading, "Reply 17 for closer Hansack" and "Reply 18 for Dice K's schd". The command disambiguation 144 may continue numbering the possible replies with the next available command aliases. If the number 17 is sent as the reply to the provocation message 902, the user may be sent a message 904 with a message header, the message, and a request for a reply reading, "Reply 19 for scoop". If the number 19 is sent as the reply, a message 908 may be sent to a user with a message header and the message. There may be no additional requests for reply. If the number 18 is sent as the reply to the provocation message 902, the user may be sent a message 910 with a message header, the message, and a request for a reply reading, "Reply 20 for scoop". If the number 20 is sent as the reply, a message 912 may be sent to a user with a message header and the message. There may be no additional requests for reply.

Figure 10:
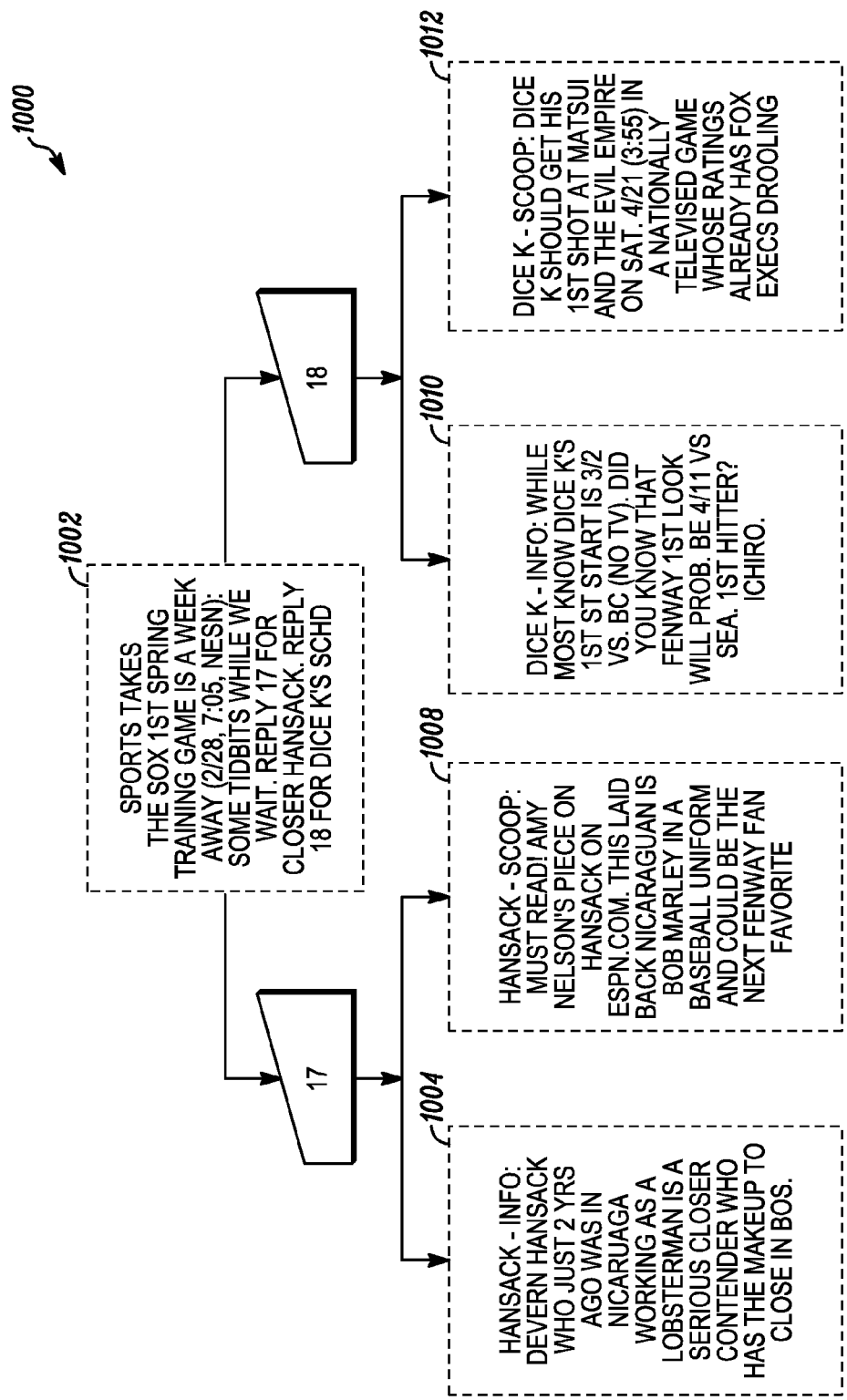
FIG. 10 depicts a sample message flow demonstrating command disambiguation.

Referring to FIG. 10, depicted is an example of a message flow where command disambiguation is demonstrated. A provocation message 1002 may be sent to a user with a message header, the message, and requests for reply reading, "Reply 17 for closer Hansack" and "Reply 18 for Dice K's schd". If the number 17 is sent as the reply to the provocation message 902, the user may be sent multiple messages 1004 and 1008 relating to closer Hansack. For example, a single command, such as 17 in this example, may indicate that all possible messages should be sent to the user. Each message may have a message header and the message, but no additional requests for a reply. If the number 18 is sent as the reply to the provocation message 902, the user may be sent multiple messages 1010 and 1012 relating to Dice K's schedule. Each message may have a message header and the message, but no additional requests for a reply.

Figure 11:
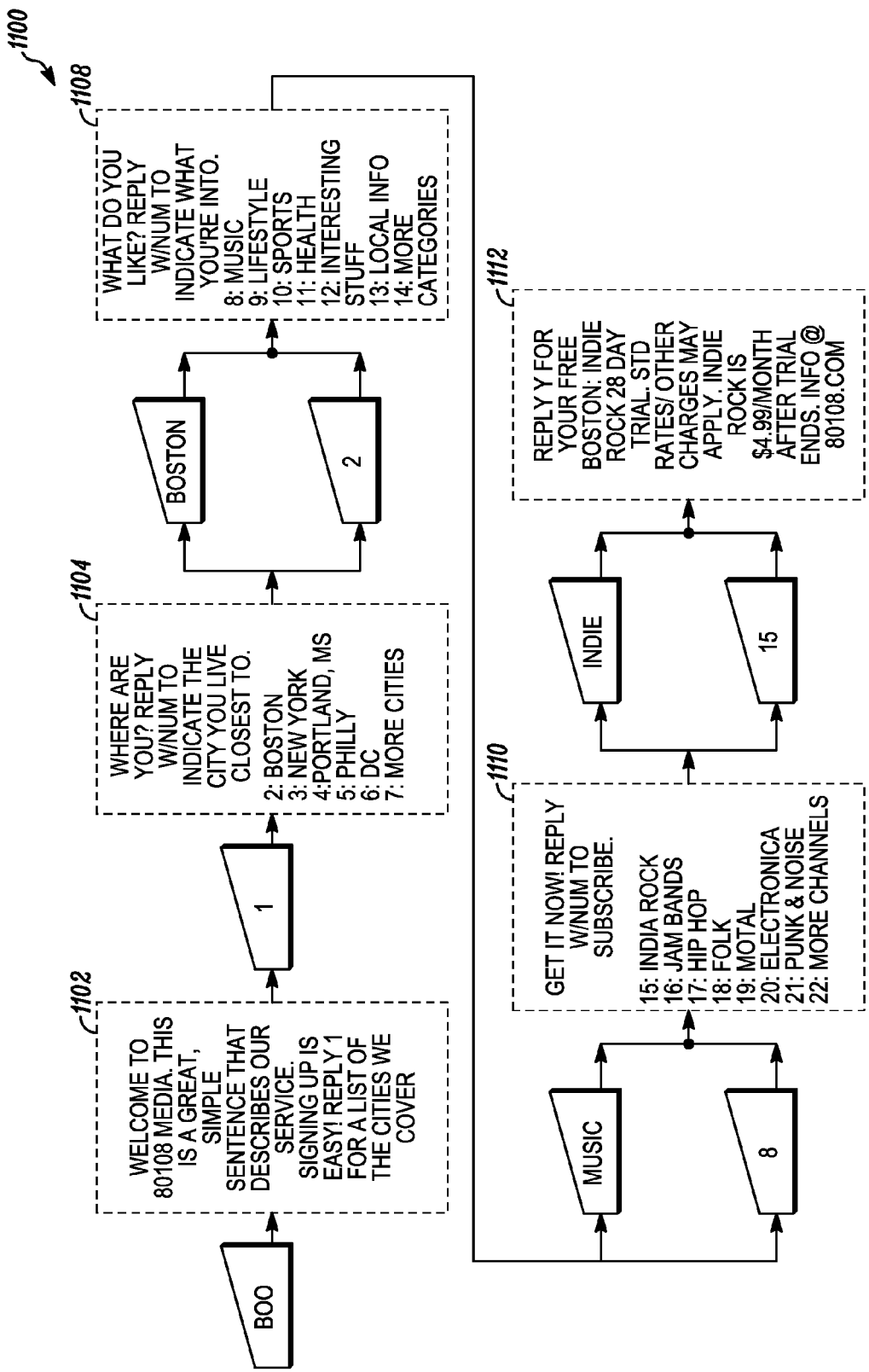
FIG. 11 depicts a sample message flow for user acquisition demonstrating command disambiguation.

Referring to FIG. 11, a message flow for user acquisition may involve command disambiguation. For example, a provocation message 1102 may be sent with a request for reply reading 'Reply 1 for the list of cities we cover'. After a user may reply with '1', they may receive a message with a numbered list of cities 1104. The command disambiguation 144 may continue numbering the possible replies with the next available command aliases. The user may reply with the number which indicates the city they are closest to, such as '2' for Boston, or they may reply with a number which indicates that no city on the list is close and that additional cities should be displayed for selection. Once a user may select a city, they may be prompted via a subsequent message to select an interest 1108. For example, they may be presented a request for reply reading 'Reply w/ num to indicate what you're into". This may be followed with a list of interests associated with a number, such as 8 for music, 10 for sports, 14 to indicate a desire to see additional interest categories, and the like. After a user may indicate an interest by replying with the number associated with that interest, the user may be prompted to subscribe to a specific channel within that interest category via a subsequent channel subscription message 1110. For example, a user may be presented with a list of possible channels associated with a number, such as '15' for Indie Rock, '17' for Hip Hop, '22' for more channels, and the like, and may be asked to "Reply w/num to subscribe". Upon replying with a number to subscribe to a channel, a user may be sent a subscription pitch or conformation message 1112. The subscription pitch or confirmation message 1112 may comprise a request for reply to confirm the subscription, information regarding billing, information regarding the duration of a free trial, information regarding the host of the channels, and the like.

Figure 12:
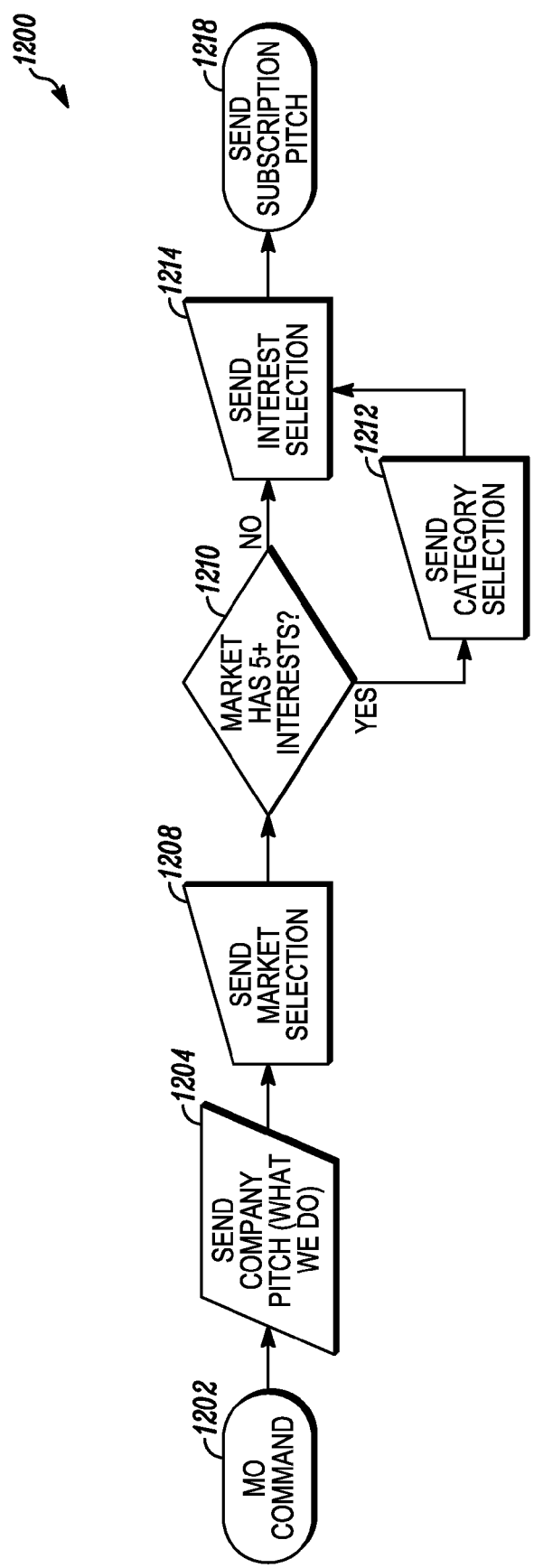
FIG. 12 depicts a process for subscription.

Referring to FIG. 12, a process for user subscription may involve command disambiguation. In an embodiment, a mobile originating message that may contain information regarding a market, category, or interest may initiate a subscription request. Starting at logical block 1202, a mobile originated command may be sent from a handset. The mobile originated command may contain information regarding a market, category, or interest. Processing flow may continue to logical block 1204, where in response to the mobile originated command, the user may be sent a company pitch. The company pitch may describe what subscriptions are available, what information may be available, what opportunities may be available, and the like. Processing flow may continue to logical block 1208 where a market selection message may be sent to the handset. The markets in the market selection message may be pruned down to the 5 closest markets based on an area code. Processing flow may continue to logical block 1210 where a test may determine whether the market has more than 5 interests. If the outcome of the test is positive, processing flow may continue to logical block 1212 where a user may be sent a category selection, as described herein. Processing flow may then continue to logical block 1214 where the user may be sent an interest selection, as described herein. If the outcome of the test at logical block 1210 is negative, then processing flow may continue directly to logical block 1214 where the user may be sent an interest selection, as described herein. After an interest may be selected at logical block 1214, processing flow may continue to logical block 1218 where a subscription pitch may sent to the handset, as described herein, and processing flow may terminate.

Figure 13:
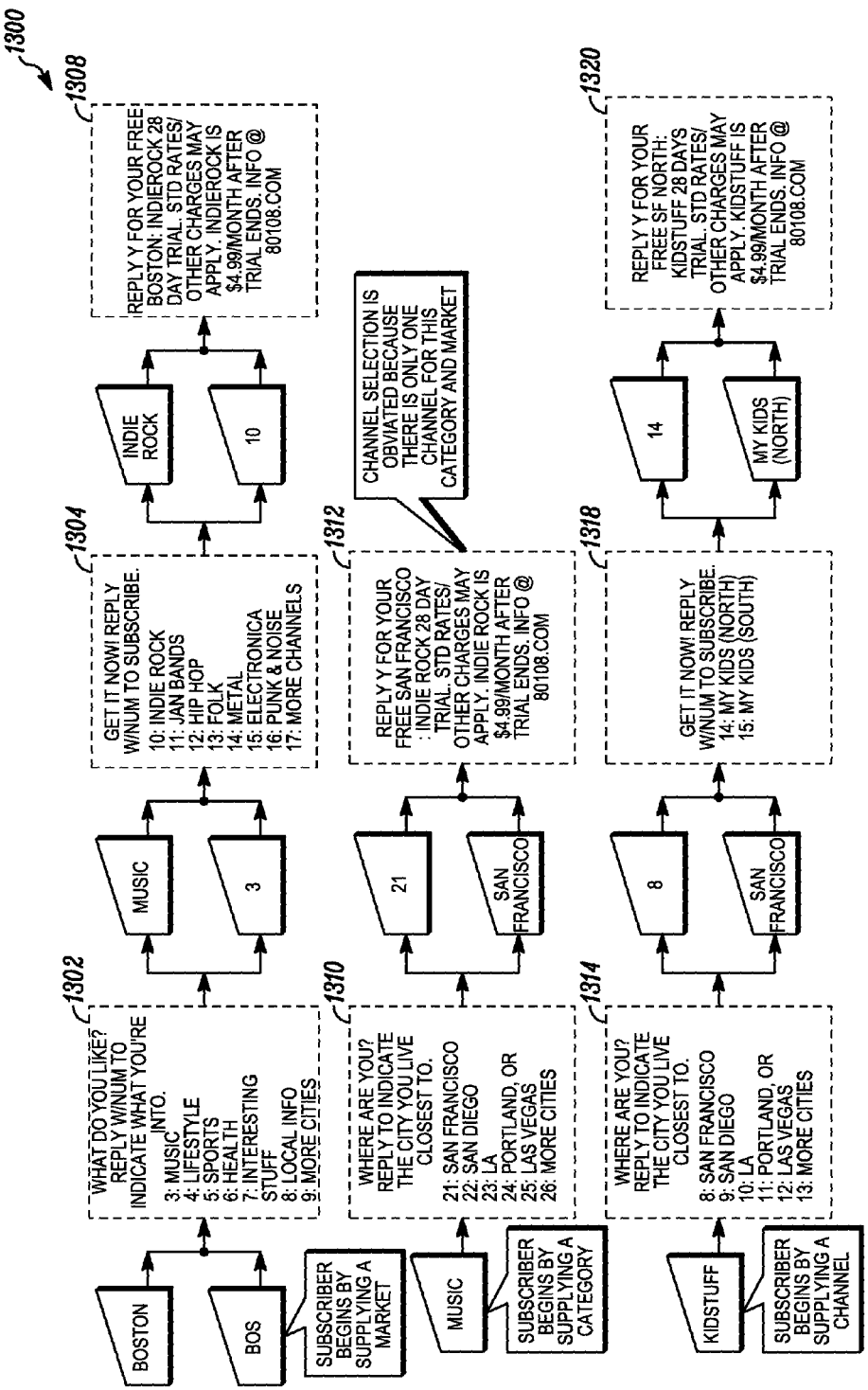
FIG. 13 depicts a sample message flow for user acquisition demonstrating command disambiguation.

Referring to FIG. 13, three message flows for mobile originated user acquisition may involve command disambiguation. In the first message flow, the subscriber may begin the mobile originated subscription process by supplying a market selection, such as by indicating what city they live in. Then, an interest indication message 1302 may be sent to a user with a request for reply reading "Reply w/num to indicate what you're into". This may be followed with a list of interests associated with a number, such as 3 for music, 6 for Health, and the like. After a user may indicate an interest by replying with the number associated with that interest, the user may be prompted to subscribe to a specific channel within that interest category via a subsequent channel subscription message 1304. The command disambiguation 144 may continue numbering the possible replies with the next available command aliases. For example, a user may be presented with a list of possible channels associated with a number, such as '10' for Indie Rock, '12' for Hip Hop, '17' for more channels, and the like, and may be asked to "Reply w/num to subscribe". Upon replying with a number to subscribe to a channel, a user may be sent a subscription pitch or conformation message 1308. The subscription pitch or confirmation message 1308 may comprise a request for reply to confirm the subscription, information regarding billing, information regarding the duration of a free trial, information regarding the host of the channels, and the like. In the second message flow, a subscriber may begin the mobile originated subscription process by supplying a category selection, such as music, sports, and the like. The command disambiguation 144 may number the possible replies with the next available command aliases. The user may be presented with a list of cities and the user may select the city that they are closest to be replying with the number associated with the city they are closest to, such as '21' for San Francisco, or they may reply with a number which indicates that no city on the list is close and that additional cities should be displayed for selection. Once a user may select a city, they may be sent a subscription pitch or conformation message 1312. The subscription pitch or confirmation message 1312 may comprise a request for reply to confirm the subscription, information regarding billing, information regarding the duration of a free trial, information regarding the host of the channels, and the like. Channel selection may be obviated because there may be only a single channel corresponding to a particular category and market. In a third message flow, the user may begin the mobile originated subscription process by supplying a channel selection, such as Kid Stuff, Local Sports, and the like. The command disambiguation 144 may number the possible replies with the next available command aliases. The user may be presented with a list of cities and the user may select the city that they are closest to be replying with the number associated with the city they are closest to, such as '8' for San Francisco, or they may reply with a number which indicates that no city on the list is close and that additional cities should be displayed for selection. Once a user may select a city, they may be sent a channel selection message 1318. For example, a user may be presented with a list of possible channels associated with a number, such as '14' for My Kids (North), '15' for My Kids (South), and the like, and may be asked to "Reply w/num to subscribe". Upon replying with a number to subscribe to a channel, they may be sent a subscription pitch or conformation message 1320. The subscription pitch or confirmation message 1320 may comprise a request for reply to confirm the subscription, information regarding billing, information regarding the duration of a free trial, information regarding the host of the channels, and the like.

In an embodiment, user acquisition may be facilitated by current users. A user may share content with another user or potential user by transmitting or forwarding them a message containing the content or a link to the content. The transmitted or forwarded message may be accompanied with a message regarding subscription.

Figure 14:
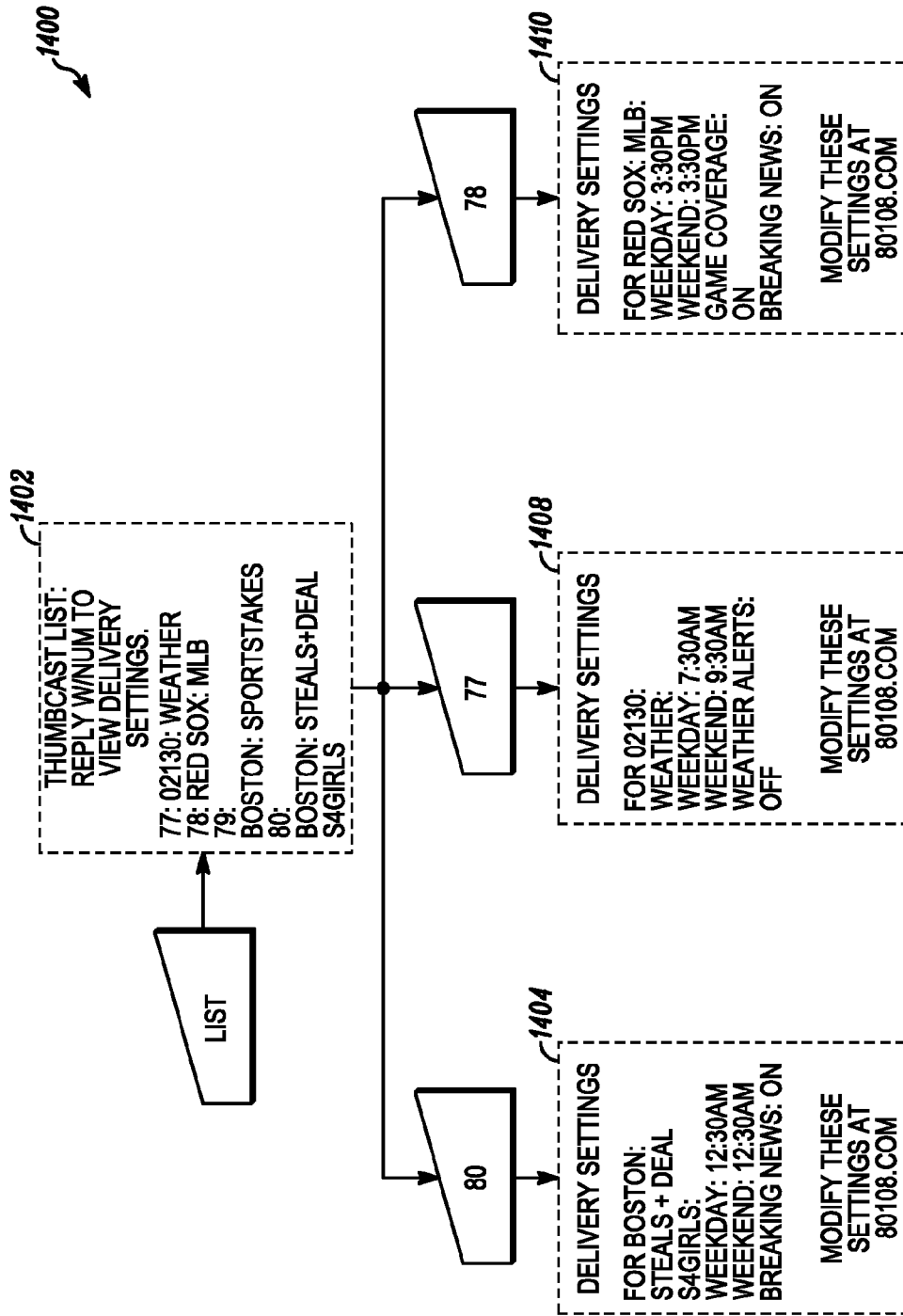
FIG. 14 depicts a sample message flow for profile management demonstrating command disambiguation.

Referring to FIG. 14, a message flow for profile management may involve command disambiguation. Users may be able to list interests that may be part of their subscription, remove interests from their subscription, access read-only settings, and the like. For example, a Thumbcast List message 1402 may be sent to a user which may list all channels a user may be subscribed to, such as 02130: Weather, Red Sox: MLB, and the like. Each of the channels may be associated with a command alias, such as a number. The message 1402 may contain a request for reply that may read "Reply w/num to view delivery settings". Upon replying with a number for a subscribed channel, a user may receive a message 1404, 1408, 1410 with delivery settings for the subscribed channel. Delivery settings may include delivery times on a weekday, delivery times on a weekend, Breaking News settings, Weather Alerts settings, Game Coverage settings, Zip Code settings, instructions for modifying settings, and the like.

In an embodiment, command disambiguation may enable a dynamic user acquisition platform. Command disambiguation may enable tracking online user acquisition campaigns and measurement of conversion and adoption through the Internet. A user acquisition transaction may commence on the Internet, such as when a user receives an email or accesses a landing page advertising a channel. When the user indicates an interest in the channel, they may be asked for their mobile phone number or other mobile identification. When the mobile phone number is captured, a cookie may be set on the machine linking the mobile phone number and a unique command alias. A sign-up message may be generated and sent to the mobile phone number indicating that the user should text back the unique command alias if they would like to sign-up for channel content delivery. The link between the mobile phone number and command alias can be tracked to demonstrate that the conversion originated with an online transaction.

In an embodiment, the user may be able to use natural language commands such as "Y", "N", "yes", "no", "more", "sports", "news", "restaurant reviews", or the like to indicate the next content that should be provided. Depending on the content provided to the user, the user may be presented with a plurality of next actions such as displaying more information, selecting from more than one next display content, selecting related content, selecting an advertisement content, or the like. In an embodiment, the user's response may be interpreted as a partial natural language command. For example, as the natural language command is entered, possible commands may be filled in to anticipate the full command such as "Yes" being interpreted from "Y". The natural language command may be interpreted based on the provided content such as interpreting "Patriots" from a user input of "Pat" when the provided content is related to a sports report on the New England Patriots.

In an embodiment, the commands may be structured language where the user understands certain commands provide a particular response. For example, the user may want transmitted content for the local weather forecast and may enter "W" along with a zip code for the forecast or enter "C" along with a zip code for the current conditions. In a similar manner, the user may be able to request information related to sports, the stock market, news, or the like. Someone knowledgeable in the art may understand that there may be many different methods of creating a structured command language to be used in requesting information in this manner.

In an embodiment, there may be methods and systems for determining which response from a user is related to which transmitted content. In an embodiment, transmitted content and user responses may be based on a transmission time frame, aliasing of commands, or the like. For example, the user response may be expected within a certain time frame of the provided content transmission for proper matching of the response and content. In embodiments, there may be protocols to determine the time frames of the responses and the determination of an action to be taken if the user response is not received within the required time frame. For example, if a response is not received in the specified time, a confirmation content text may be transmitted to the user to confirm the user's response.

In an embodiment, response commands provided by the user may be unique to the content to which the user is responding and not unique to the entire command system. For example, following the provided content, the user may be provided with response choices that may be unique to the provided content such as "C" for continue and "S" for stop. It may be understood that the "C" and "S" could represent other commands when used with other content. In an embodiment, the content management platform 102 may track the content transmitted to users and the anticipated responses to the content for determination of what the next transmission to the user may be. This may eliminate the need to develop a complicated structured command language to provide unique responses to each situation. In an embodiment, this may allow content providers to determine the user responses on the fly as the content is developed.

Content targeting 148 may comprise querying a user profile or a database of past interactions, subscriptions, transactions, and the like for behavior and information that may facilitate content targeting 148. For example, if a user may have a high score in trivia 132 related to science, a Discovery Channel feed may be suggested to the user. The suggestion may be via an SMS, phone call, voicemail, e-mail, page, and the like.

Search 150 may be associated with subscription management 140. Search terms may be used to facilitate content targeting 148.

In an embodiment, published content may be provided in a number of different formats that may include SMS, Microsoft media services (MMS), wireless application protocol (WAP), interactive voice response (IVR), simple network management protocol (SNMP), mobile video, two way communication, or the like. In an embodiment, the different mobile device formats may be used individually or in combination to provide mobile connectivity 152.

In an embodiment, SMS may be used to send and receive text messaging, provide a menu structure for accessing the other connectivity formats, or the like. SMS may be used individually to receive text content and allow the user options of receiving more content, receiving advertisement, or the like as described herein. SMS may also be used to select other connectivity content such as phone calls, WAP, MMS, IVR, audio, video, or the like. For example, the user may receive textual content and respond with a request for more information as an audio feed; the user may then receive audio information related to textual content. For example, an SMS message may be sent to user that says "Brady hit Troy Brown for 20 Yard TD". The footer of the message may say, "To hear live audio cast, text back 'A'", which may deliver an MMS message with audio content or, if the mobile device is a phone, a call may be received and an IVR system may play the audio broadcast. The footer of the message may also say, "To see live streaming video, text back 'V'", which may deliver a streaming video broadcast. Mobile connectivity 152 may be two-way, such as push and pull systems. For example, Google searches are generated by a user pull whereas delivery of a Weatherbug daily forecast may be a push.

In an embodiment, the user may be able to receive published content using a WAP connection; the WAP connection may provide connectivity such as a web browser. Using a WAP connection, the user may be able to receive a combination of textual content, audio content, video content, or the like. In an embodiment, using the WAP connection, the user may have the same capabilities of receiving published content provided by SMS such as receiving textual content containing a provocation message, a description, additional information, footers, advertisement, input options, or the like, but may also receive audio, image, video, or the like with the textual content. In an embodiment, the additionally received audio, image, video, or the like may be related to the published content, may be an advertisement, or the like.

In an embodiment, the user may receive published content that may contain an option for the user to input a request for an IVR connection; the IVR connection may then play an audio related to the published content. In an embodiment, once connected to the IVR the user may have a number of different choices of audio to receive.

In an embodiment, the mobile device connectivity service may provide support for SNMP to provide the collection and exchange of network connection information between the content service and the user. The connection information may be used to determine routing, flag issues with a particular connection, provide information for enhancing the connection capabilities, or the like. In an embodiment, the user may be unaware that the network information is being collected and transmitted.

In an embodiment, mobile video may be provided with the published content as a selected option from an SMS message, as part of a WAP connection, as part of an MMS connection or the like. If a user receives SMS published content, the content may also contain a user option to receive mobile video; after the user selects the option, the video may be transmitted to the user's mobile device.

In an embodiment, the system may support multi-modal content delivery and the integration of media platforms around a unifying event. In an embodiment, content received on one kind of media or channel may be followed up with content on another kind of media or channel. For example, if David Ortiz hits a home run, a user may receive an SMS alert with updated statistics for the slugger. The user may then click on a link, respond with a command alias, or otherwise indicate a desire to receive additional content and be directed to a WAP page with more detail, click on a link to receive or place a call to access audio, be directed to an Internet page to follow a link, be directed to another channel to receive additional or complementary information, and the like. The integration of SMS, WAP, and the Internet may be integrated for an improved mobile experience. The Internet may be good for delivery larger format content, different configurations of content, and browsing for content discovery, while SMS may be good for push of content without the clutter associated with the Internet experience, but SMS may not be good for browsing. WAP may be better for scrolling, albeit in small form factor. All three media types, SMS, WAP, and Internet may be integrated into a single mobile experience. For a single event or single collection of content, content may be distributed among multiple media types. For example, a user may be notified of a concert on the Esplanade via SMS. The user may then retrieve a next deeper level of information on the Esplanade concert via WAP. The user may then be directed to the Internet to purchase a ticket to the concert. In embodiments, SMS messaging may drive return traffic to WAP. In an embodiment, messages may be pushed to users via WAP Push, which may allow WAP content to be pushed to the mobile handset with minimum user intervention. A WAP Push may be a specially encoded message which includes a link to a WAP address. WAP Push may be specified on top of a WAP Datagram Protocol (WDP); as such, it may be delivered over any WDP-supported bearer, such as GPRS or SMS. On receiving a WAP Push, a WAP enabled handset may automatically give the user the option to access the WAP content.

In an embodiment, content delivered to a mobile device may also be available for viewing on the Internet. Content may be searchable on the Internet. Content searched or accessed on the Internet may comprise a subscription interface. For example, when a user searches for local music information and accesses content associated with the platform, they may have the opportunity to subscribe to content delivery. Subscription may be initiated over the Internet and either may be completed on the Internet or completed on a mobile device.

In an embodiment, the mobile connection may be made from a plurality of communication channels. Each channel may provide different content for the user to receive such as news, sports, weather, reviews, special interest, interviews, or the like. The channels may use a structured template approach for the design of content to provide rapid development of new content. Additionally, the channel template may also incorporate an application design wizard to guide content developers in the application of content into a channel. For example, a new content provider may desire to develop a new channel providing content on restaurants; the new content provider may access the design wizard to format the content into the published content format for the channel. The design wizard may provide templates for number of characters per page, formatting user options, formatting user connection types, formatting message content, or the like. This method may allow non-technical content providers a simple interface to develop and publish content to a mobile connection channel.

In embodiments, subscribers who subscribe to a plurality of channels may choose to receive a digest of messages instead of a single message from each channel, such as a daily digest, a weekly digest, and the like. For example, if a user subscribes to multiple channels, they may receive one digest delivered via a WAP page. The availability of the digest on the WAP page may be announced via an SMS message. For example, a user subscribing to four channels, weather, advertising, news, sports, and fashion, may choose to receive messages from the weather channel as they are available but choose to receive messages from the remaining three channels as a digest. They may receive a WAP link to the digest pushed through SMS.

Ad integration 154 may comprise advertisements delivered as footers in SMS messages delivering content. Interactivity may be directed by footers with content. For example, subscribers to a local New York City events channel may receive an SMS message announcing a black-tie event for tomorrow night at the South Street Seaport. The footer of the message may comprise a question, such as "Check for tomorrow's weather forecast?" Footers may be assigned based on the remaining text in the message. For example, a message capped at 160 characters with only 13 left narrows the footers that may be associated to those that are only 13 characters in length. Advertising may be targeted based on interactions with footers in SMS messages. In the example above, advertisements that may be related to the content of the black-tie event message may be an advertisement for a car service, a hair salon, a tuxedo rental shop, and the like. In another example, a weather message saying, "Another day of sub-zero temperatures" may provide an ad opportunity for a travel product. In any event, the footer may be selected should the user wish to receive more information regarding the content in the footer or the advertised goods and/or services. Advertising may be targeted based on a user profile, content, location, and the like. Content transformation 108, command disambiguation 144, footers and ad targeting may be associated to provide mobile media services. Ad integration 154 may facilitate publishers and vendors to SMS directly through the system at fixed intervals. For example, publishers and vendors may send one message per week to each subscriber. Publishers and vendors may advertise to their user base based on their distribution efforts. Ad integration 154 may facilitate real time lookups and footers on a mobile platform with ad targeting.

Similar to content delivery being integrated across multiple media platforms, so can advertisements. Advertisements associated with content may associated with content delivery or discovery on the Internet, a Web search page, Internet Yellow Pages, mobile search, SMS, WAP, directory assistance, podcasts, and the like. Advertisers may create a single advertisement and it may be associated and/or accessible with content on any kind of media. In other embodiments, similar to content, an advertisement may first be seen on an SMS and then further accessed via WAP and then finally interacted with fully, as in to make a purchase for example, on the Internet. In an embodiment, advertisements delivered to a mobile phone may comprise a click-to-call or pay-per-call link. For example, content regarding a guided hike in the Blue Hills Reservation may be associated with a Timberland advertisement for hiking boots or simply a sponsorship notification, such as "These hikes are brought to you by Timberland." A user may interact with the advertisement by texting back 'D' for deals to receive additional SMS' on sales from Timberland, by clicking on a click-to-call link and getting connected to the nearest Timberland retailer, and the like. In an embodiment, command disambiguation may enable tracking unique impressions made by advertising and targeting advertisements to specific users. For example, a user viewing an advertisement on the Internet may be asked to text back a command alias, such as the number '25', to a specific address in order to view a particular advertisement. A cookie set on the user's machine may be linked to the command alias in order to track user activity on the web along with user activity on a mobile phone. Tracking may be done across multiple media, such as SMS, MMS, WAP, e-mail, and the Internet.

Referring to FIG. 15, advertising may be multi-modal. Advertisements may be delivered to the user either as standalone content or in association with other content. Related or additional advertisement information may be offered from within the advertisement or by the advertisement. Responding to the offer may include texting back a short form command, clicking on a WAP or Web link, clicking to call a phone number, and the like. The initial advertisement may be delivered via at least one of SMS, MMS or email and may contain a link to additional advertisement information on a WAP content page. The WAP advertisement may solicit an email address for the delivery of additional advertisement information via email. The email advertisement may provides links to additional advertisement information on a Web page intended for delivery to a PC.

In an embodiment, advertisements may be contextual. For example, content may be tagged with keywords, location information, start date, end date, and the like. Advertising may be contextually targeted to certain content using keywords locations, times, and the like. In an embodiment, location information associated with content may be mapped. Location information associated with an advertisement may be overlaid onto the content map to demonstrate a proximity.

Analytics 158 may be associated with subscription management 140. For example, user interaction with content and footers may be tracked on a channel-by-channel basis. Information obtained from these analytics 158 may be used to refine content and ad targeting.

A server-side session management facility 160 may be used to track information transmitted to and from the user, maintain a user response table, track resources being used, measure and aggregate analytical transmission information, track information transmitted to the users, manage user information sessions, or the like. In an embodiment, there may be a plurality of information content channels from which a user may receive content and provide responses related to the content. For each of the channels, a plurality of users may receive the channel content and respond back with user commands.

In an embodiment, user commands in response to provided content may be tracked by the server-side session management facility to properly match the user's responses to the provided content. For example, more than one content provided to the user may contain similar response possibilities. One or more of the provided content may have an acceptable response of "1" and the server-side session management facility may track the outgoing content and match the user incoming responses to assure that the user's response is matched to the proper content. In this manner, the need to have unique commands may be eliminated. In an embodiment, there may be a table, database, file, or the like to record the transmitted content with the user and to track the user transmitted responses to map the user responses to the transmitted content. Using the response map, the proper next content may be transmitted to the user.

In an embodiment, the server-side session management facility may maintain flags for certain sources of content. Flags may facilitate pay-per-performance billing 142.

In an embodiment, a plurality of analytical information may be tracked for media types, keyword uses, subscriptions, routing performance, or the like. The analytical information may provide aggregation of resource usage, cash flow analysis (e.g. subscriptions and advertisement), keyword mapping to certain advertisements, or the like.

In an embodiment, users may use more than one media to access content on their mobile device. The user may access a website to indicate a desire to receive content on the user's mobile device. The server-side session management facility may track the user from the visit to the website to receiving content on the user's mobile device. The server-side session management facility may track the website access, record a subscription request, record the user subscription information, track content transmitted to the user, or the like. In an embodiment, this information may be aggregated into a plurality of reports providing information on the user's content activities such as the type of content requested, the type of content to which the user responded, or the like.

In an embodiment, user keyword responses may be tracked by the server-side session management facility 160. The keyword responses may be matched to the content that was provide to the user to track the effectiveness of a particular promotion. For example, a restaurant may pay for an advertising campaign and it may be desired to track from what type of content that users responded. Using the keyword responses, the ranking of the provided content may be determined from which the restaurant received the most responses. The restaurant may have received most of its responses from sporting content and this may allow the restaurant to further direct their future advertising.

In an embodiment, subscription information may be aggregated to track user subscription information to different information campaigns. The information campaigns may include advertisement, promotions, or the like. The user subscription information may be aggregated for some or all of the information campaigns to provide feedback as to the effectiveness of the information campaign. In an embodiment, rates paid by advertisers may be related to the effectiveness of information campaigns.

In an embodiment, the server-side session management facility 160 may track mobile performance routing by recording the metrics of the transmission of content to the user mobile device. Routing decisions may be made on the analytic information related to route traffic and the rates at which the user mobile device is receiving content. In an embodiment, the performance routing decisions may be made in real time, made by historical information, made automatically, made manually, or the like. In an embodiment, the transmission route may be determined before content is transmitted, as the content is transmitted, after the content is transmitted, or the like. The transmission route may be modified during the transmission of content to a user mobile device.

In an embodiment, information related to content transmitted to a user phone number may be used to track the information transmitted, the type of information transmitted, the user response, the time the information was transmitted, the time the user responded, and the like. This information may allow inferences to be made between the content that was sent to the user and the response that was returned. For example, if information is tracked for the type of content transmitted to a user, partial responses by the user may be analyzed to infer the meaning of the response. As described herein, this may permit a user to enter a partial response such as "Pat" and the response may be understood as "Patriot" because the content transmitted to the user was related to the New England Patriots.

In an embodiment, the server-side management facility 160 may track user interaction information to provide for a customized user experience, measure user activity, predict user activity, or the like. The user experience may be customized by analysis of the user's activities to determine the type of content the user may be accessing the most. With this information, the user may be provided with content that may more consistently interest the user. The information may also be used to predict the user's future content access activity; the predicted activity may provide information to set advertisement rates, determine which content to provide, determine which content to eliminate, or the like. This information may be used to make suggestions to users. For example, the information may be used to suggest other venues to a user or other users with similar user profiles.

In an embodiment, the user's subscription profile may be auto-populated by recording the channels to which the user connects, by the channels to which other users with similar profiles connect, a user's interaction with SMS messages, footers, dynamic landing pages 310, paid-placement advertising 308, venues, or the like. The user may initially enter information into a user profile to indicate the type of interests the user may have, these interests may be used to suggest channels that may be of interest the user. As the user connects to different channels, the channels visited may be recorded by a profile facility. In an embodiment, as the user connects to channels over a period of time the profile facility may use an algorithm to determine a pattern of channels visited and may suggest other channels of interest to the user; the suggested channel may be presented to the user as a user option with any provided content. If the user indicates that the suggested content is of interest, the profile facility may update the users profile to record the new channel interest. In this manner, as the user connects to different channels over time, the users profile may be updated to reflect the user's channel connections. Additionally, if the profile facility determines that a channel has not been connected to for a period of time, the profile facility may send the user a message to determine if the user desires to delete the channel(s) from the user profile.

In an embodiment, a user's profile may be modified using information from other user profiles that may be similar. In an embodiment, the profile facility may aggregate user information for the type of channels visited, and make suggestions of channels to visit based on other user profiles. It may be determined by the profile facility that the user may have a certain percentage of channels in common with other users and the user may receive a message suggesting a new channel based on the other user's profiles. In an embodiment, if the user indicates that the suggested channel is of interest, the channel may be added to the user profile.

In an embodiment, a user profile may be modified by a rating a user may give for published content, a channel, or the like. In an embodiment, when a user receives published content, the user may be provided with an opportunity to provide a rating of the published content. In an embodiment, the rating may be a thumbs up, thumbs down, a star rating, a number rating, a letter rating, or other rating method that may provide a scale of the content. A user profile may be modified based on the rating a user gives the content. In an embodiment, a user may be able to view the ratings that a user has provided for the content, channel, or the like.

In an embodiment, the rating a user provides content or a channel may affect real time user content. For example, if a number of users viewing certain content give the content a very high rating, the content's high rating may be sent to other users with similar interests to indicate that there is current content in which the user may be interested. Based on the very high rating, a user may receive a user option to view the highly rated content.

In an embodiment, the social networking channels to which the user connects may modify the user profile. Depending on the social channels (e.g. trivia, sports, hobbies) for which the user receives content, the user may receive suggestions on new channels to which to connect. If a user selects to view the suggested channel, a user profile may be modified to reflect the selection. In an embodiment, the profile facility may aggregate the social networking channel information for user profiles to determine user profile modification suggestions.

In an embodiment, a user location or behavior may modify a user profile. In an embodiment, if a user location may be determined (e.g. GPS phone), the user location may be recorded and aggregated to determine suggested changes to a user profile. For example, if it is determined that a user frequently visits a certain restaurant or restaurant type the profile facility may send the user content suggesting channel content related to similar restaurants. If the user selects the suggested channel content, the user's profile may be modified to reflect the new selected content. Profile creation and management 162 may facilitate real time user generated content. For example, users may 'thumbs up' their current location for the evening and others may see popular venues or events for the evening based on these real time ratings.

In an embodiment, a user may be able to manage a user profile by accessing the profile through a web-based management system, by accessing a mobile device management system, or the like. The user may be able to view, modify, add, delete, or the like various aspects of a user profile such as preferred channels, preferred content, and the like.

In an embodiment, profile creation and management 162 may be associated with validation of user profiles. For example, a user profile may say that the user is a friend of Michael Jordan. If Michael Jordan participates in the system, independent validation of the user profile may be possible by comparing the locations of the user and Michael Jordan and tracking the number of times they have been within ten feet of each other in the last few weeks.

In an embodiment, profile creation and management 162 may be associated with configuring services. Referring now to FIG. 8, a web-based profile management 804, may be used to set content preferences and a simple schedule 808 for content delivery 114. A user may also be able to set a detailed delivery schedule 810.

In embodiments, a user interface to the content publication service may include real time user generated content capabilities, subscription addition and cancellation capabilities, profile management, toolbars, dialog boxes, menus, searching, multi-part and narrative content display capabilities, authoring environments, or the like.

As described herein, real time content may be provided to the user by sending user option content that may allow the user to select the next content to be displayed on a user mobile device. The next displayed content may be related content, new content, a survey, a rating, trivia, or the like. The displayed content may be sent to the user as SMS, WAP, MMS, IVR, mobile video, or the like as individual content or as a combination of contents.

A user may be able to add, cancel, or revise subscription information using SMS messages, using webpage access, or the like. In an embodiment, by sending an SMS message, the user may be able to directly request a subscription or cancel a subscription to the content publication service. Additionally, a user may be able to send an SMS message to view the subscription information and make revisions such as the type of subscription (e.g. monthly or ad hoc payments), access, payment schedules, or the like. In an embodiment, the user may also be able to access the same subscription information using a content publication service related website. The content publication service website may allow the user to add a subscription, delete a subscription, revise a subscription, or the like.

A user may have access to a user profile where the preferences for user content may be defined. A user may be able to add, delete, modify, or the like information that may affect the delivery of content to the user such as content delivery schedules, type of content, preferred channels, advertisement types, or the like. Additionally, there may be a profile facility that may record a user's received content to determine if changes should be suggested to the user. As described herein, the profile facility may record user content, answers to user input options, hobbies, similarity to other user profiles, location, or the like to make determinations if other content or channels may be of interest to a user. If it is determined that there may be additional content that may be of interest, the profile facility may send content to the user suggesting a revision to the user's profile.

In an embodiment, the user interface may comprise a toolbar or menu that may include shortcuts to frequently used features, access to the user profile, viewing the available channels, viewing the available content, or the like. In an embodiment, the toolbar or menu may be displayed all the time, may be displayed upon user request, or the like. The user may be able to place the toolbar or menu in a user preferred location on the user interface such as at the top of the mobile device screen, at the bottom of the mobile device screen, or the like. The user may also have control over the color used for the toolbar or menu, running the toolbar or menu in the background or foreground, or the like.

In an embodiment, the user interface may include a searching capability that the user may use to search for content, channels, social networking, or the like. In an embodiment, the search may be by keyword, natural language, short keywords, or the like. After the search, the user may be presented with a search result that may match the search input; the search results may include content, channels, or the like.

In an embodiment, the user interface may provide a method and system of displaying multi-part or narrative content on the users mobile device display. As described herein, published content may be greater in length then may be displayed on a user mobile device display. In the case where the content may require more than one page to display all of the published content, the user may be presented with input options to indicate if more content should be displayed, different content should be displayed, content display should be terminated, or the like.

In an embodiment, the user interface may provide an authoring environment. The user may be provided an authoring environment to facilitate content creation or modification. In an embodiment, the authoring environment is accessible through a web-based user interface, a mobile device based user interface, or the like.

In an embodiment, the content providers may have a user interface to write, format, add advertisement, publish, and the like to a channel. As described herein, the content providers may be provided a content wizard that may provide a template for content development. The wizard may provide formatting for the content, advertising placement within the content, publishing to the appropriate channel, control the timing of publishing content, or the like. In an embodiment, the content provider user interface may be a web-based interface, a mobile device based interface, or the like.

In an embodiment, there may be a user interface for advertisers for determining where to place advertisement within published content. Using the interface, the advertiser may be able to associate advertisement with user keyword searches. For example, the advertiser may indicate that the advertisement should be displayed when a user searches for weather information. When the user receives the weather information, the user will also receive the associated advertisement as part of the content. Using the interface, the advertiser may be able to provide advertisement content, determine advertisement content delivery options (e.g. time of day), the value to be paid for the advertisement, the type of content to associate with the advertisement, or the like.

In an embodiment, using the advertiser interface, the advertiser may also be able to indicate the placement of paid placement advertisement. The advertiser may be able to indicate certain times of the day to send advertisement content to a user. For example, an automobile advertisement may be published to all users during rush hour each day. Using the interface, the advertiser may be able to provide advertisement content, placement location, placement time, the type of user to send the advertisement, or the like. The advertiser may use the user interface to receive alerts of user behavior.

In an embodiment, there may be a user interface for the host of the content service that may provide subscription management, content management, analytics, or the like. In an embodiment, the host subscription management facility may allow the host to view, modify, add, or delete subscription information for a user or a group of users. In an embodiment, the subscription management facility may provide information such as user subscription rates, subscriptions associated to a particular channel, subscriptions associated to a particular content provider, subscriptions by channel, subscriptions by content provider, user subscription rates by time period, subscriptions made by a website, subscriptions by mobile device, or the like. In an embodiment, the subscription management facility may be a web-based interface.

In an embodiment, there may be a content management facility that may allow the host to view and manage content as it is published, before it is published, after it is published, or the like. In an embodiment, the content management facility may allow the host to stop content from being published, delay the publishing of content, change the channel that content on which content will be published, or the like. The content management facility may provide the host with a level of control of the content being published using the host controlled channels. In an embodiment, the content management facility may be web-based.

In an embodiment, there may be a web-based analytics facility that may provide the host with aggregated information such as type of content provided, advertisements provided, revenue stream from advertisements, revenue stream from subscriptions, content publishing routing, or the like. The analytics may be provided to the host in real time, as historical information, or the like. For example, the content publishing routing may be provided to the host in real time and the host may be able to revise publishing routes to resolve slow transmission routes.

Figure 2:
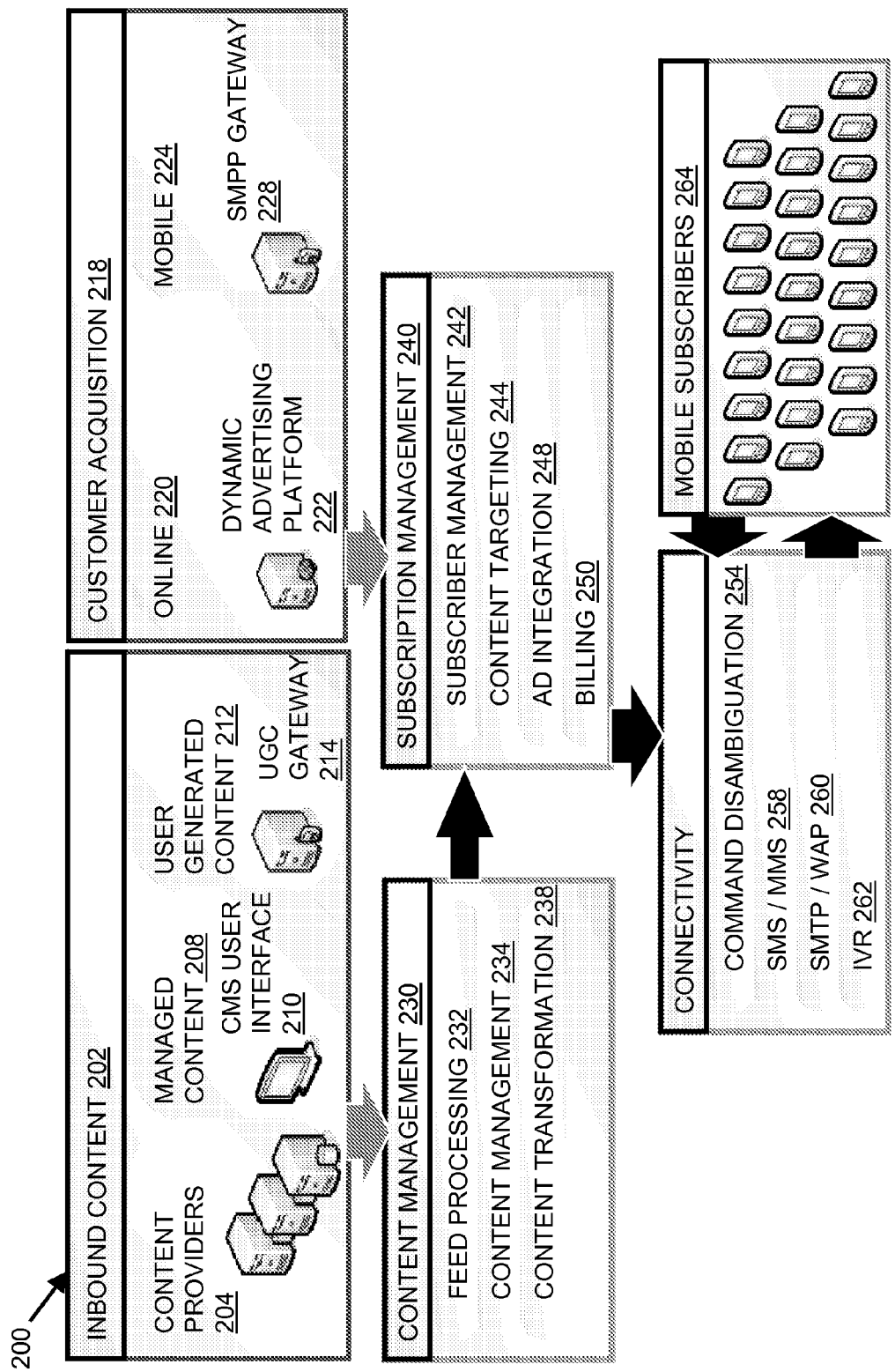
FIG. 2 depicts a system for mobile media services.

Referring now to FIG. 2, a system for mobile media services may comprise inbound content 202, customer acquisition 218, content management 230, subscription management 240, connectivity 252, and mobile subscribers 264. Inbound content 202 may be provided by content providers 204, managed content 208 developed over a CMS user interface 210, and user generated content 212 developed over a user generated content gateway 214. Content management 230 may be facilitated by feed processing 232, content management 234, and content transformation 238. Customer acquisition may be online 220 through a dynamic advertising platform 222 or via a mobile 224 process, such as an SMPP gateway 228. Subscription management 240 may comprise subscriber management 242, content targeting 244, ad integration 248, and billing 250. Content management 230 is associated with subscription management 240. Subscription management 240 is associated with mobile connectivity 252. Connectivity 252 comprises command interpreter 254, SMS/MMS 258, SMTP/WAP 260, and IVR 262. Mobile subscribers 264 interact with the system through connectivity 252.

Figure 4:
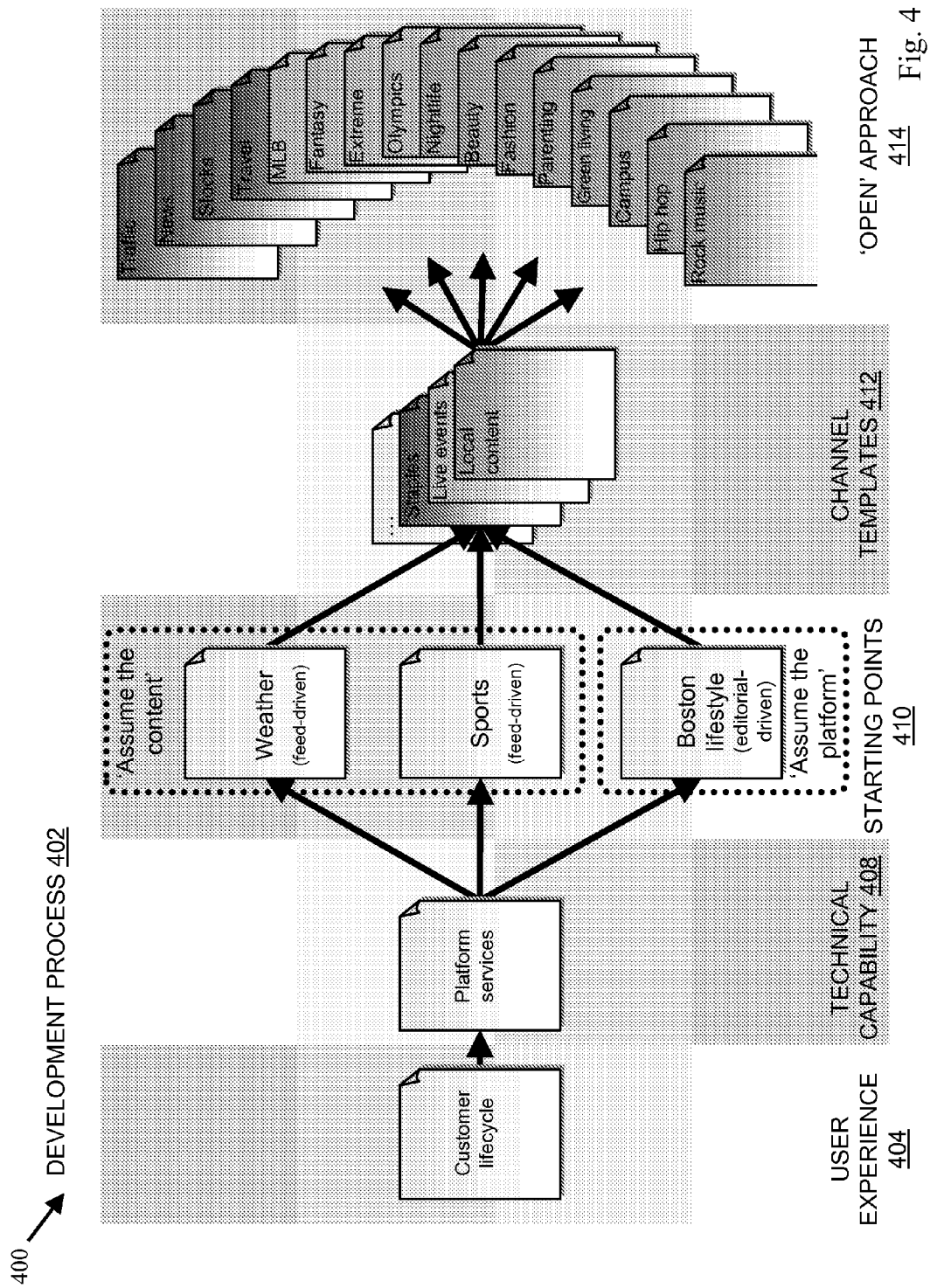
FIG. 4 depicts the development process.

Referring now to FIG. 4, a development process 402 may comprise a user experience 404, technical capability 408, starting points 410, channel templates 412, and an 'open' approach 414. The user experience 404 comprises customer lifecycle. The technical capability 408 comprises platform services. Starting points 410 comprise content. In any event, all content may be subject to channel templating 412. The 'open' approach 414 facilitates user access to a variety of local, personalized and national content channels.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer program product embodied on a non-transitory computer readable medium, comprising:
computer code for identifying content from one or more of a plurality of data sources;
computer code for transforming the content into one or more messages;
computer code for delivering a first message of the one or more messages to a handset for presentation;
computer code for managing a message flow based on user responses, the message flow determining a next message based on a user response to a previous message;
computer code for receiving a delivery mode selection of at least two delivery modes, the at least two delivery modes including a first delivery mode in which at least a first portion of the content is to be delivered to a user and a second delivery mode in which at least a second portion of the content is to be delivered to the user, at least one of the two delivery modes including a short message service delivery mode involving a short message service;
computer code for delivering the at least first portion of the content to the user utilizing the first delivery mode;
computer code for delivering the at least second portion of the content to the user utilizing the second delivery mode;
computer code for receiving a command sequence including a first constant portion and a second variable portion, utilizing the short message service;
computer code for delivering a response to the command sequence utilizing the short message service, the response including response information identified as a function of both the first constant portion and second variable portion of the command sequence;
computer code for delivering a content menu utilizing the short message service in the form of a menu short message service message including: a first menu selection option indicating a first menu short form command including a first one or more characters associated with a first content, a second menu selection option indicating a second menu short form command including a second one or more characters associated with a second content, and a third menu selection option indicating a third menu short form command including a third one or more characters associated with a third content;
computer code for receiving the first menu short form command associated with the first content;
computer code for receiving the second menu short form command associated with the second content;
computer code for receiving the third menu short form command associated with the third content;
computer code for, in response to the receipt of the first menu short form command associated with the first content, delivering the first content;
computer code for, in response to the receipt of the second menu short form command associated with the second content, delivering the second content; and
computer code for, in response to the receipt of the third menu short form command associated with the third content, delivering the third content.

2. A computer program product embodied on a non-transitory computer readable medium, comprising:
computer code for identifying content from a plurality of data sources that is relevant to a channel;
computer code for transforming at least a portion of the content into one or more messages;
computer code for delivering a first message of the one or more messages to a handset for presentation;
computer code for managing a message flow based on a user input by determining a next message based on the user input;
computer code for receiving at least one delivery selection involving at least two delivery modes, the at least two delivery modes including a first delivery mode in which at least a first portion of the content is to be delivered to a user and a second delivery mode in which at least a second portion of the content is to be delivered to the user, at least one of the two delivery modes including a short message service delivery mode involving a short message service;
computer code for delivering the at least first portion of the content to the user utilizing the first delivery mode;
computer code for delivering the at least second portion of the content to the user utilizing the second delivery mode;
computer code for receiving a schedule for receiving the one or more messages utilizing the short message service;
computer code for delivering the one or more messages utilizing the short message service, based on the schedule;
computer code for receiving a command sequence including a first constant portion and a second variable portion, utilizing the short message service, where the first constant portion provides context for the second variable portion;
computer code for delivering a response to the command sequence utilizing the short message service, the response including response information identified as a function of both the first constant portion and second variable portion of the command sequence;
computer code for populating a user profile based on an interaction with the short message service;
computer code for receiving a first short form command associated with a first content;
computer code for receiving a second short form command associated with a second content;
computer code for receiving a third short form command associated with a third content;
computer code for, in response to the receipt of the first short form command associated with the first content, delivering the first content;
computer code for, in response to the receipt of the second short form command associated with the second content, delivering the second content; and
computer code for, in response to the receipt of the third short form command associated with the third content, delivering the third content.

3. The computer program product of claim 1, further comprising computer code for causing display of at least one user profile page for receiving user input data that is capable of being used to define the user profile associated with the user.

4. The computer program product of claim 3, further comprising computer code for allowing receipt of a selection of content, utilizing the at least one user profile page, the computer program product being operable such that the content includes an event channel including event-related information.

5. The computer program product of claim 4, further comprising computer code for updating the user profile based on the selection of content.

6. The computer program product of claim 4, further comprising computer code for suggesting additional content based on the selection of content.

7. The computer program product of claim 4, further comprising:
   computer code for tracking user participation associated with at least one of the plurality of channels;
   computer code for identifying at least one metric associated with the user participation; and
   computer code for providing rewards based on the at least one metric.

8. The computer program product of claim 1, further comprising:
   computer code for causing delivery of event-related information utilizing the short message service in the form of an event-related short message service message including a first selection option indicating a first event short form command associated with a first event and a second selection option indicating a second event short form command associated with a second event;
   computer code for allowing receipt of the first event short form command associated with the first event, in response to the event-related short message service message;
   computer code for allowing receipt of the second event short form command associated with the second event, in response to the event-related short message service message;
   computer code for, in response to the receipt of the first event short form command associated with the first event, causing delivery of first event information associated with the first event; and
   computer code for, in response to the receipt of the second event short form command associated with the second event, causing delivery of second event information associated with the second event.

9. The computer program product of claim 8, wherein the computer program is operable such that the first event information describes the first event.

10. The computer program product of claim 8, wherein the computer program is operable such that the second event information describes the second event.

11. The computer program product of claim 1, further comprising:
    computer code for causing delivery of particular channel information associated with a particular channel; and
    computer code for allowing receipt of posted information in association with the particular channel information associated with the particular channel.

12. The computer program product of claim 2, further comprising:
    computer code for allowing receipt of a content rating from the user in association with at least a particular portion of the content;
    computer code for updating the user profile based on the content rating; and
    computer code for causing delivery of content rating-based information to others based on the content rating.

13. The computer program product of claim 12, wherein the computer program is operable such that the content rating includes a thumbs up rating.

14. The computer program product of claim 2, further comprising:
    computer code for causing delivery of an advertisement to the user, based on the user profile;
    computer code for allowing receipt of an advertisement rating from the user in association with the advertisement;
    computer code for updating the user profile based on the advertisement rating; and
    computer code for causing delivery of the advertisement to others based on the advertisement rating.

15. The computer program product of claim 2, further comprising:
    computer code for determining a location of the user;
    computer code for updating the user profile based on the location of the user; and
    computer code for causing delivery of at least a location-related portion of the content based on the location of the user.

16. The computer program product of claim 15, further comprising computer code for causing delivery of another advertisement to the user, based on the location.

17. The computer program product of claim 15, wherein the computer program is operable such that the location of the user is determined utilizing a global positioning system.

18. The computer program product of claim 2, further comprising:
    computer code for causing display of at least one advertisement page for receiving advertiser input that is capable of being used to create at least one created advertisement associated with an advertiser, and for receiving additional advertiser input that is capable of being used to define an advertisement campaign associated with the at least one created advertisement of the advertiser;
    computer code for receiving a time of day to be stored in association with the advertisement campaign, utilizing the at least one advertisement page;
    computer code for receiving an advertisement-related location to be stored in association with the advertisement campaign, utilizing the at least one advertisement page;
    computer code for receiving a user type to be stored in association with the advertisement campaign, utilizing the at least one advertisement page; and
    computer code for delivering the at least one created advertisement of the advertiser, based on the time of day of the advertisement campaign, the advertisement-related location of the advertisement campaign, and the user type of the advertisement campaign.

19. The computer program product of claim 2, wherein the computer program is operable such that the at least two delivery modes include at least two of a SMS delivery mode, a WAP delivery mode, a MMS delivery mode, an IVR delivery mode, a SMTP delivery mode, a GSM delivery mode, an Internet delivery mode, and a GPRS delivery mode.

20. The computer program product of claim 1, wherein the computer program is operable such that each page includes a web page.

21. The computer program product of claim 2, further comprising:
   computer code for allowing receipt of a location rating from the user in association with a particular location of the user; and
   computer code for causing delivery of location-rating related information to others based on the location rating.

22. The computer program product of claim 2, further comprising:
   computer code for allowing receipt of an event rating from the user in association with a particular event; and
   computer code for causing delivery of event rating-based information to others based on the event rating.

23. The computer program product of claim 1, further comprising computer code for including application code for receiving and formatting at least a portion of the content, utilizing the handset.

24. The computer program product of claim 2, wherein the computer program is operable such that the user profile is capable of including age information, lifestyle information, location information, and culture information.

25. The computer program product of claim 2, wherein the computer program is operable such that the content relates to at least one of weather, advertising, news, sports, entertainment, lifestyle, culture, community, user-generated content, or social networking content.

26. The computer program product of claim 2, wherein the computer program is operable such that the channel is for at least one of a particular type of content, a particular content provider, a particular advertisement, or a particular promotion.

27. The computer program product of claim 2, wherein the computer program is operable such that the data sources include personal information received utilizing at least one of a website, a feed, a blog, or a database.

28. The computer program product of claim 2, wherein the computer program is operable such that the schedule includes at least one hour indicator.

29. The computer program product of claim 2, wherein the computer program is operable such that the schedule includes at least one hour indicator that is selected via an hour drop-down menu.

30. The computer program product of claim 2, wherein the computer program is operable such that the content is individual-generated and at least one other of the two delivery modes includes at least one of e-mail or Internet delivery;
   and the data sources include personal information received utilizing at least one of a website, a feed, a blog, or a database; and further comprising computer code for causing display of at least one user profile page for receiving user input data that is capable of being used to define the user profile associated with the user; and
   comprising computer code for allowing receipt of a selection of content, utilizing the at least one user profile page; the computer program product being operable such that the content includes a plurality of channels capable of including an event channel including event-related information, a news channel including news-related information, an interest channel including interest-related information, a social-networking channel including social-networking-related information, and a group channel including group-related information.

31. The computer program product of claim 2, further comprising:
   computer code for allowing receipt of content ratings each including a thumbs up rating from multiple users in association with at least a particular portion of the content; and
   computer code for aggregating the content ratings.

32. The computer program product of claim 2, further comprising:
   computer code for allowing receipt of content ratings each including a thumbs up rating from multiple users in association with at least a particular portion of the content; and
   computer code for aggregating the content ratings.

33. The computer program product of claim 32, further comprising computer code for affecting delivery of content rating-based information based on the aggregating.

34. The computer program product of claim 1, further comprising:
   computer code for identifying at least one aspect of the handset; and
   computer code for altering the delivering of the first message, based on the at least one aspect.

35. The computer program product of claim 1, further comprising:
   computer code for identifying a type of the handset; and
   computer code for altering at least one aspect of at least one of the transforming or delivering, based on the type.

36. The computer program product of claim 2, further comprising computer code for allowing commenting on the content, where the content includes the commenting.

37. The computer program product of claim 1, further comprising application code for installation on the handset for supporting at least one of the at least two delivery modes including a WAP delivery mode.

38. The computer program product of claim 1, further comprising application code for installation on the handset for supporting advertising in connection with the content.

39. The computer program product of claim 2, wherein the computer program is operable such that advertisements are targeted to the user based on received information, the user profile, a user response to the content, and a user location.

40. The computer program product of claim 1, wherein the computer program is operable such that the one or more messages delivered utilizing the short message service includes an Internet link for retrieving additional related content utilizing a browser.

41. A non-transitory computer readable storage medium storing a computer program product, comprising:
   computer code for providing at least one user page for receiving user input that is capable of being used to define a user profile associated with a user;
   computer code for receiving a selection of content, utilizing the at least one user page;
   computer code for delivering different portions of the content to the user utilizing a plurality of delivery modes including at least two of: a SMS delivery mode, a WAP delivery mode, a MMS delivery mode, an IVR delivery mode, a SMTP delivery mode, a GSM delivery mode, an Internet delivery mode, and a GPRS delivery mode;
   computer code for delivering a first portion of the content to the user utilizing a first delivery mode including at least one of: the SMS delivery mode, the WAP delivery mode, the MMS delivery mode, the IVR delivery mode, the SMTP delivery mode, the GSM delivery mode, the Internet delivery mode, and the GPRS delivery mode;

computer code for delivering a second portion of the content to the user utilizing a second delivery mode that is different from the first delivery mode and includes at least one of: the SMS delivery mode, the WAP delivery mode, the MMS delivery mode, the IVR delivery mode, the SMTP delivery mode, the GSM delivery mode, the Internet delivery mode, and the GPRS delivery mode;

computer code for receiving a first command associated with a first content;

computer code for receiving a second command associated with a second content;

computer code for, in response to the receipt of the first command associated with the first content, delivering the first content;

computer code for, in response to the receipt of the second command associated with the second content, delivering the second content; and computer code for receiving information in association with at least a portion of the content.

42. The non-transitory computer readable storage medium of claim 41, and further comprising:

computer code for causing display of at least one advertisement page for receiving advertiser input that is capable of being used to create at least one created advertisement associated with an advertiser, and for receiving additional advertiser input that is capable of being used to define an advertisement campaign associated with the at least one created advertisement of the advertiser;

computer code for receiving a time of day to be stored in association with the advertisement campaign, utilizing the at least one advertisement page;

computer code for receiving an advertisement-related location to be stored in association with the advertisement campaign, utilizing the at least one advertisement page;

computer code for receiving a user type to be stored in association with the advertisement campaign, utilizing the at least one advertisement page; and computer code for delivering the at least one created advertisement of the advertiser, based on the time of day of the advertisement campaign, the advertisement-related location of the advertisement campaign, and the user type of the advertisement campaign.

43. The non-transitory computer readable storage medium of claim 41, further comprising:

computer code for causing delivery of an advertisement to the user, based on the user profile;

computer code for allowing receipt of an advertisement rating from the user in association with the advertisement;

computer code for updating the user profile based on the advertisement rating; and computer code for causing delivery of the advertisement to others based on the advertisement rating.

44. The non-transitory computer readable storage medium of claim 43, wherein the computer program is operable such that the advertisement rating includes a thumbs up rating.

45. The non-transitory computer readable storage medium of claim 44, further comprising:

computer code for causing display of at least one advertisement page for receiving advertiser input that is capable of being used to create at least one created advertisement associated with an advertiser, and for receiving additional advertiser input that is capable of being used to define an advertisement campaign associated with the at least one created advertisement of the advertiser;

computer code for receiving a time of day to be stored in association with the advertisement campaign, utilizing the at least one advertisement page;

computer code for receiving an advertisement-related location to be stored in association with the advertisement campaign, utilizing the at least one advertisement page;

computer code for receiving a user type to be stored in association with the advertisement campaign, utilizing the at least one advertisement page; and computer code for delivering the at least one created advertisement of the advertiser, based on the time of day of the advertisement campaign, the advertisement-related location of the advertisement campaign, and the user type of the advertisement campaign.

46. The non-transitory computer readable storage medium of claim 45, further comprising:

computer code for allowing receipt of additional content ratings each including a thumbs up rating from multiple users in association with the particular portion of the content; and computer code for aggregating the additional content ratings.

47. The non-transitory computer readable storage medium of claim 46, further comprising:

computer code for allowing receipt of an event rating from the user in association with a particular event; and computer code for causing delivery of event rating-based information to others based on the event rating.

48. The non-transitory computer readable storage medium of claim 47, wherein the computer program is operable such that the content is individual-generated and the plurality of delivery modes includes the SMS delivery mode, the SMTP delivery mode, and the Internet delivery mode; and the content channels include personal information received utilizing at least one of a website, a feed, a blog, a post, or a database; the computer program product being operable such that the content is capable of including an event channel including event-related information, a news channel including news-related information, an interest channel including interest-related information, a social-networking channel including social-networking-related information, and a group channel including group-related information.

49. The non-transitory computer readable storage medium of claim 47, wherein the computer program is operable such that the content is individual-generated and the plurality of delivery modes includes the SMS delivery mode, the SMTP delivery mode, and the Internet delivery mode; and the content channels include information received utilizing at least one of a website, a feed, a blog, or a database;

the computer program product being operable such that the content is capable of including an event channel including event-related information, a news channel including news-related information, an interest channel including interest-related information, a social-networking channel including social-networking-related information, and a group channel including group-related information.

50. A non-transitory computer readable storage medium storing a computer program product, comprising:

code for causing display of at least one user page for receiving user input that is capable of being used to define a user profile associated with a user;

code for receiving a selection of content, utilizing the at least one user page;

code for delivering different portions of the content to the user utilizing a plurality of delivery modes including at least three of: a SMS delivery mode, a MMS delivery mode, an IVR delivery mode, a SMTP delivery mode, a GSM delivery mode, an Internet delivery mode, a GPRS delivery mode, and a portable device-related delivery mode facilitated by application code;

code for delivering a first portion of the content to the user utilizing a first delivery mode including at least one of: the SMS delivery mode, the MMS delivery mode, the IVR delivery mode, the SMTP delivery mode, the GSM delivery mode, the Internet delivery mode, the GPRS delivery mode, and a portable device-related delivery mode facilitated by the application code;

code for delivering a second portion of the content to the user utilizing a second delivery mode that is different from the first delivery mode and includes at least one of: the SMS delivery mode, the MMS delivery mode, the IVR delivery mode, the SMTP delivery mode, the GSM delivery mode, the Internet delivery mode, the GPRS delivery mode, and the portable device-related delivery mode facilitated by application code;

code for receiving a first command associated with a first content;

code for receiving a second command associated with a second content;

code for, in response to the receipt of the first command associated with the first content, delivering the first content;

code for, in response to the receipt of the second command associated with the second content, delivering the second content; and code for delivering at least a portion of the content to the user via an application which is configured for installation on a portable device to: receive at least part of the content; format the at least part of the content involving at least one of a font, a color, or a placement associated with the at least part of the content; and store a plurality of words that are reused in association with the at least part of the content.

51. The non-transitory computer readable storage medium of claim 50, wherein the computer program product is operable such that the code for delivering is for delivering the different portions of the content to the user utilizing the plurality of delivery modes including each of the Internet delivery mode and the portable device-related delivery mode facilitated by application code.

52. The non-transitory computer readable storage medium of claim 50, wherein the computer program product is operable such that the code for delivering is for delivering the different portions of the content to the user utilizing the plurality of delivery modes including each of the SMTP delivery mode, the Internet delivery mode, and the portable device-related delivery mode facilitated by application code.

53. The non-transitory computer readable storage medium of claim 50, wherein the computer program product is operable such that the code for delivering is for delivering the different portions of the content to the user utilizing the plurality of delivery modes including each of the SMS delivery mode, the SMTP delivery mode, the Internet delivery mode, and the portable device-related delivery mode facilitated by application code.

54. The non-transitory computer readable storage medium of claim 50, wherein the computer program product is operable such that the application is operable for displaying advertisements with the at least part of the content.

55. The non-transitory computer readable storage medium of claim 50, wherein the computer program product is operable such that the delivery modes are selectable via a web page interface.

56. The non-transitory computer readable storage medium of claim 50, wherein the computer program product is operable such that at least a portion of the content includes business information.

57. The non-transitory computer readable storage medium of claim 50, wherein the computer program product is operable such that at least a portion of the content includes profile management information.

58. The non-transitory computer readable storage medium of claim 50, wherein the computer program product is operable such that at least a portion of the content includes event information.

59. The non-transitory computer readable storage medium of claim 50, wherein the computer program product is operable such that an SMS reply is capable of being received for confirmation purposes.

60. The non-transitory computer readable storage medium of claim 50, wherein the computer program product is operable such that a verification message is sent to in connection with a mobile phone number indicating that a user is required to text back a unique command alias.

61. The non-transitory computer readable storage medium of claim 50, wherein the computer program product is operable such that a verification message is sent to in connection with a mobile phone number indicating that a user is required to text back a unique command alias, where such text is required to be received within a predetermined timeframe.

62. The non-transitory computer readable storage medium of claim 50, wherein the computer program product is operable such that that one or more messages are delivered utilizing the SMS delivery mode and include an Internet link for retrieving additional related content utilizing a browser.

63. The non-transitory computer readable storage medium of claim 50, wherein the computer program product is operable such that that one or more messages are delivered utilizing the SMS delivery mode and include a phone number for retrieving additional related content utilizing the IVR delivery mode.

64. The non-transitory computer readable storage medium of claim 50, wherein the computer program product is operable such that the application includes a plug-in.

65. The non-transitory computer readable storage medium of claim 50, wherein the computer program product is operable such that the portable device-related delivery mode includes a WAP delivery mode.

66. The non-transitory computer readable storage medium of claim 50, wherein the computer program product is operable such that the portable device-related delivery mode includes an XML delivery mode.

67. The non-transitory computer readable storage medium of claim 50, wherein the computer program product is operable such that the first portion of the content is capable of being the same as the second portion of the content.

68. The non-transitory computer readable storage medium of claim 41, wherein the computer program product is operable such that the computer code for delivering is for delivering the different portions of the content to the user utilizing the plurality of delivery modes including each of the SMTP delivery mode, the Internet delivery mode, and a portable device-related delivery mode facilitated by application code.

69. The non-transitory computer readable storage medium of claim 41, wherein the computer program product is operable such that the computer code for delivering is for delivering the different portions of the content to the user utilizing the plurality of delivery modes including each of the SMS delivery mode, the SMTP delivery mode, and the Internet delivery mode.

70. The non-transitory computer readable storage medium of claim 41, wherein the computer program product is operable such that the computer code for delivering is for delivering the different portions of the content to the user utilizing the plurality of delivery modes including each of the Internet delivery mode and a portable device-related delivery mode facilitated by application code.

71. The non-transitory computer readable storage medium of claim 70, wherein the computer program product is operable such that the application code is operable for displaying advertisements with the at least part of the content.

72. The non-transitory computer readable storage medium of claim 41, wherein the computer program product is operable such that the delivery modes are selectable via a web page interface.

73. The non-transitory computer readable storage medium of claim 41, wherein the computer program product is operable such that at least a portion of the content includes business-related event information.

74. The non-transitory computer readable storage medium of claim 41, wherein the computer program product is operable such that an SMS reply is capable of being received for confirmation purposes.

75. The non-transitory computer readable storage medium of claim 41, wherein the computer program product is operable such that a verification message is sent to in connection with a mobile phone number indicating that a user is required to text back a unique command alias.

76. The non-transitory computer readable storage medium of claim 41, wherein the computer program product is operable such that a verification message is sent to in connection with a mobile phone number indicating that a user is required to text back a unique command alias, where such text is required to be received within a predetermined timeframe.

77. The non-transitory computer readable storage medium of claim 41, wherein the computer program product is operable such that that one or more messages are delivered utilizing the SMS delivery mode and include an Internet link for retrieving additional related content utilizing a browser.

78. The non-transitory computer readable storage medium of claim 41, wherein the computer program product is operable such that that one or more messages are delivered utilizing the SMS delivery mode and include a phone number for retrieving additional related content utilizing the IVR delivery mode.

79. The non-transitory computer readable storage medium of claim 41, wherein the computer program product is operable such that the information received in association with at least the portion of the content is posted.

80. The non-transitory computer readable storage medium of claim 41, and further comprising: computer code for receiving a schedule, and computer code for delivering at least a component of the content utilizing the SMS delivery mode, based on the schedule.

\* \* \* \* \*